United States Patent
Aoyama et al.

(10) Patent No.: US 8,810,082 B2
(45) Date of Patent: Aug. 19, 2014

(54) LINEAR MOTOR

(75) Inventors: Yasuaki Aoyama, Hitachinaka (JP); Yoshitaka Iwaji, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 391 days.

(21) Appl. No.: 13/201,466

(22) PCT Filed: Mar. 13, 2009

(86) PCT No.: PCT/JP2009/001133
§ 371 (c)(1),
(2), (4) Date: Aug. 15, 2011

(87) PCT Pub. No.: WO2010/103575
PCT Pub. Date: Sep. 16, 2010

(65) Prior Publication Data
US 2011/0298308 A1 Dec. 8, 2011

(51) Int. Cl.
*H02K 41/00* (2006.01)

(52) U.S. Cl.
USPC ..................... 310/12.22; 310/12.25

(58) Field of Classification Search
USPC ........... 310/12.15, 12.21, 12.22, 12.24, 12.25
See application file for complete search history.

(56) References Cited

U.S. PATENT DOCUMENTS

| | | | | |
|---|---|---|---|---|
| 3,829,746 A | * | 8/1974 | Van et al. | 318/135 |
| 4,761,574 A | * | 8/1988 | Nakagawa | 310/12.27 |
| 4,945,268 A | * | 7/1990 | Nihei et al. | 310/12.22 |
| 5,218,250 A | * | 6/1993 | Nakagawa | 310/12.21 |
| 6,825,581 B1 | | 11/2004 | Joong et al. | |
| 6,943,465 B2 | | 9/2005 | Kim et al. | |
| 7,250,696 B2 | * | 7/2007 | Kim et al. | 310/12.05 |
| 7,312,542 B2 | | 12/2007 | Joong et al. | |
| 2002/0053835 A1 | | 5/2002 | Joong et al. | |

FOREIGN PATENT DOCUMENTS

| | | |
|---|---|---|
| EP | 1 332 543 B1 | 3/2005 |
| JP | 2-142352 | 5/1990 |
| JP | 3-245764 | 11/1991 |
| JP | 9-215310 | 8/1997 |
| JP | 2001-28875 | 1/2001 |
| JP | 2002-142439 | 5/2002 |
| JP | 2002-209371 | 7/2002 |
| JP | 2005-287185 | 10/2005 |
| JP | 2007-89260 | 4/2007 |
| WO | WO 02/23702 A1 | 3/2002 |
| WO | WO 02/37651 A2 | 5/2002 |

* cited by examiner

*Primary Examiner* — Dang Le
(74) *Attorney, Agent, or Firm* — Antonelli, Terry, Stout & Kraus, LLP.

(57) ABSTRACT

The invention relates to a small size and lightweight linear motor having small thrust ripples, in which the magnetic attraction working between an armature and a mover is canceled out and therefore is small. A thrust generation mechanism includes a stator (3) and a mover (5). The mover (5) includes permanent magnets (4) installed in a row so that the magnetic poles at the front and backsides of the magnets are alternately reversed along the traveling direction. The stator (3) includes upper and lower pole teeth (6), (7) having a plurality of magnetic poles (2) and arranged so as to sandwich the permanent magnets (4) of the mover (5), cores for connecting the pole teeth, and a winding (1) wound around a set of a plurality of the cores. Thrust ripples are reduced by adjusting the magnetic pole pitch (Pc) of the magnetic poles (2).

18 Claims, 28 Drawing Sheets

(a) ARMATURE UNIT PERSPECTIVE VIEW (b) ARMATURE UNIT TOP VIEW (c) ARMATURE UNIT A-A SECTION PERSPECTIVE VIEW

MAGNETIC POLE CROSS-SECTION
ENLARGED VIEW

121
INCLUSION BETWEEN
MAGNETIC POLES

5
MOVABLE
ELEMENT

4
MAGNET

2
MAGNETIC
POLE

2
MAGNETIC
POLE

LINEAR MOTOR

FIELD OF THE INVENTION

The present invention relates to linear motors that generate relative thrust between armatures and magnets, and particularly to a linear motor having a structure by which high efficiency, compact size, and small thrust ripple are achieved.

BACKGROUND OF THE INVENTION

A linear motor having a conventional thrust generating mechanism is shaped to be a cut-open rotating machine and large attraction works between a mover made up of a magnet pole row and an armature. Patent document 1 discloses a linear motor in which magnetic poles having a first polarity and second polarity are arranged alternately to cancel out the magnetic attraction. In the conventional art, armature magnet pole pitch has been a constant value as shown in FIG. 4 of patent document 1.
Patent document 1: Japanese Patent Laid-open No.

SUMMARY OF THE INVENTION

In the conventional art, since the magnetic pole pitch has been constant, there has been a defect of a large ripple of force (thrust) between the mover and the armature. As the countermeasure of the defect, setting a skew angle to the magnets is generally performed, but setting the skew angle is problematic in that the manufacturing cost of the movers is increased and determining the skew angle that is effective to remove the thrust ripple of plural orders is difficult.

An object of the present invention is to provide a linear motor having a small thrust ripple without increasing the manufacturing cost.

Another object of the present invention is to provide a linear motor that is small and light and can generate high thrust.

In one aspect of the present invention, a linear motor comprises a mover having permanent magnets, and an armature unit comprising magnet pole teeth oppositely arranged at both sides of the permanent magnets via an air gap, cores connecting these magnetic pole teeth, and armature windings that are wound around the plural magnetic teeth in common, wherein the linear motor generates thrust to move the armature unit and the mover relatively, and the linear motor is characterized in comprising a magnetic pole pair of which magnetic pole pitch (Pc) against the magnet pitch (P) of the permanent magnets is Pc=2nP±2P/qk, where n=1, 2, 3, . . . , k=1, 2, 3, . . . , and q=number of magnetic poles constituting the magnetic pole pair.

In another aspect of the present invention, when phase number M=1, 2, 3, . . . , in addition, the linear motor is characterized in comprising a magnetic pole pair of which magnetic pole pitch (Pc) against the magnet pitch (P) of the permanent magnets is Pc=2nP±2P/(qkM).

In another aspect of the present invention, the linear motor is characterized in that the armature unit is constituted in such a way that the length of the magnetic pole pitch (Pc) is variable.

In this instance, the length of the magnetic pole pitch (Pc) is preferably set by putting inclusions of different width between the magnetic poles.

In accordance with the preferred embodiment of the present invention, a linear motor having a small thrust ripple can be provided without increasing the manufacturing cost.

In accordance with the preferred embodiment of the present invention, a linear motor that is small and light and can generate high thrust can be provided.

Other objects and features of the present invention will be explained in the following embodiments.

BRIEF DESCRIPTION OF THE DRAWINGS

FIG. 23($b$) is a top view of the armature unit of the linear motor in accordance with embodiment 13 of the present invention. FIG. 23($c$) is a sectional perspective view of the armature unit of the linear motor in accordance with embodiment 13 of the present invention cut along the line A-A of FIG. 23($b$).

DESCRIPTION OF THE PREFERRED EMBODIMENTS

With reference to the drawings, embodiments of the present invention will be detailed below.

Embodiment 1

Figure 1:
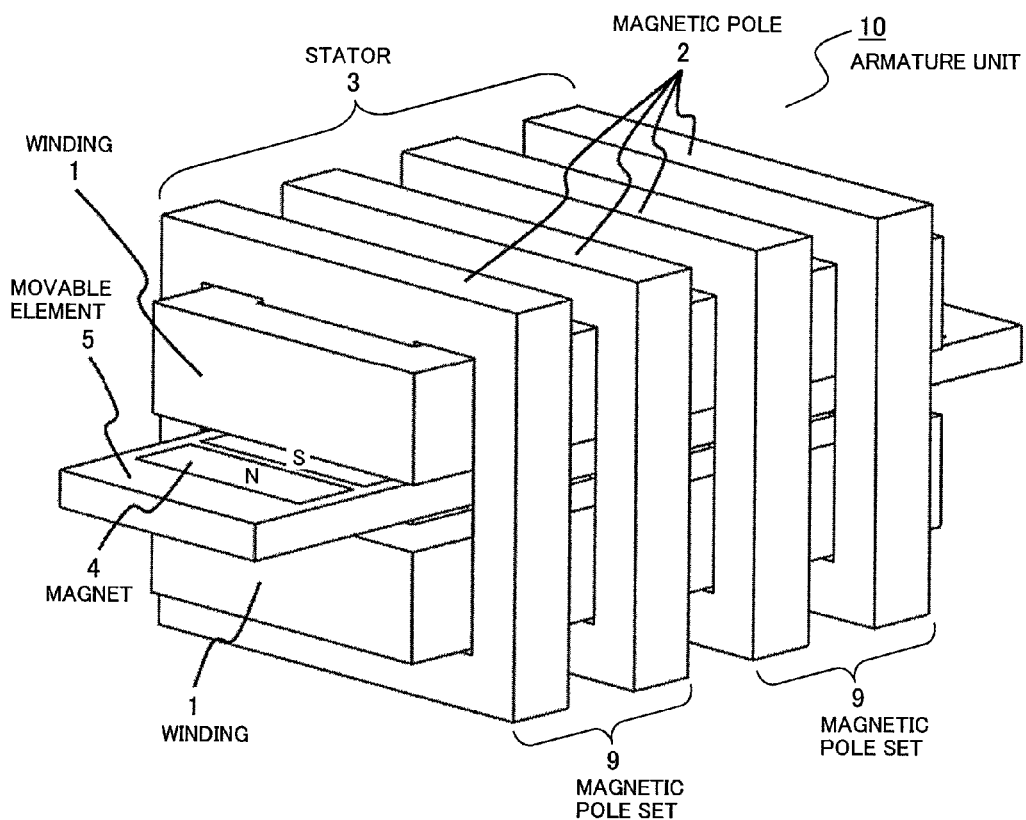
FIG. 1 is a perspective view of an armature unit constituting a linear motor in accordance with embodiment 1 of the present invention.

FIG. 1 is a perspective view of an armature unit constituting a linear motor in accordance with embodiment 1 of the present invention. An armature unit (10) comprises a stator (3) made up of winding(s) (1) for one phase and plural magnetic poles (2), and a mover (5) including a row of permanent magnets (4). The stator (3) comprises magnetic poles (2) made up of upper and lower pole teeth (6), (7) arranged opposite to the magnets (4) and iron cores (8) connecting the pole teeth (FIG. 2), and winding (1) wound around plural magnetic poles identically. Additionally, the mover (5) is equipped with the permanent magnets (4) arranged so that the magnetic poles of adjacent magnets are inverted. The stator (3) is normally fixed to a structure etc. and the mover (5) equipped with the permanent magnets (4) moves relative to the stator (3). A structure is also possible in which the magnets (4) side is fixed and the magnetic poles (2) side is moved. Plural magnetic poles are basically arranged so as to form magnetic pole pairs (9). Thrust ripple can be reduced by setting the magnetic pole pairs (9) pitch as described below.

Figure 2:
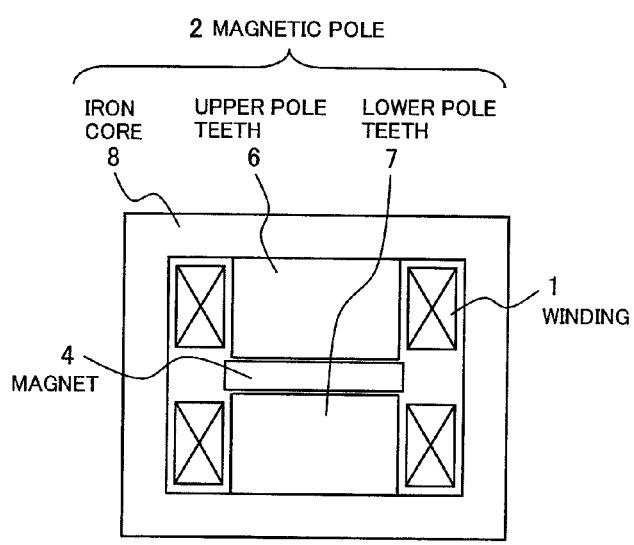
FIG. 2 is a sectional view of the armature unit of the linear motor in accordance with embodiment 1 of the present invention cut by a plane perpendicular to the traveling direction.

FIG. 2 is a sectional view of the armature unit of the linear motor in accordance with embodiment 1 of the present invention cut by a plane perpendicular to the traveling direction. The magnetic pole (2) is made up of upper and lower pole teeth (6), (7) opposite to the magnets (4) and iron cores (8) connecting the pole teeth, and the winding(s) (1) are wound around the pole teeth (6), (7). The winding(s) (1) can be wound around other positions of the magnetic poles. Additionally, the pole teeth (6), (7) and the iron core (8) are separated, but can be integrated alternatively.

Figure 3:
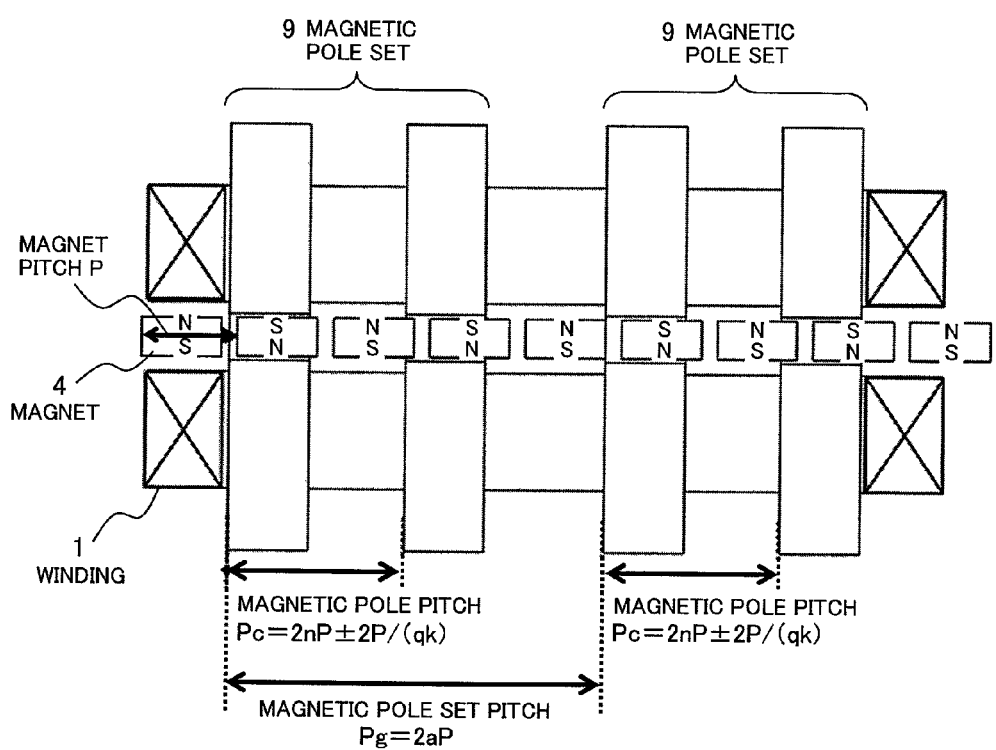
FIG. 3 is a sectional view of the armature unit of the linear motor in accordance with embodiment 1 of the present invention cut by a vertical plane parallel to the traveling direction.

FIG. 3 is a sectional view of the armature unit of the linear motor in accordance with embodiment 1 of the present invention cut by a vertical plane parallel to the traveling direction. In the armature unit, the magnetic pole (2) pitch (Pc) against the magnet (4) pitch (P) is Pc=2nP+2P/(qk) or Pc=2nP−2P/(qk), where n=1, 2, 3, . . . , k=1, 2, 3, . . . , and q=number of magnetic poles constituting a magnetic pole pair.

For FIG. 3, since the magnetic poles (2) constituting a magnetic pole pair (9) are two, q is 2 in this case. And, k can be selected arbitrarily. In a three phase linear motor, for example, in the case of a lot of ripple components of 6th order harmonic waves are included, the 6th order ripple components can be reduced by making k=6. In the case of q=2 and k=6, the ripple can be reduced by determining the magnetic pole pitch (Pc) to be Pc=2nP+P/6 or Pc=2nP−P/6.

For this magnetic pole pair, multiple arrangements of the same pairs can be made with magnetic pole pair pitch Pg=2aP. In the formula described above, a=1, 2, 3, . . . , and these constants n and a are set so as not to cause interference mechanically. In addition, the magnetic pole pair (9) is not necessarily made up of adjacent magnetic poles (2).

Figure 4:
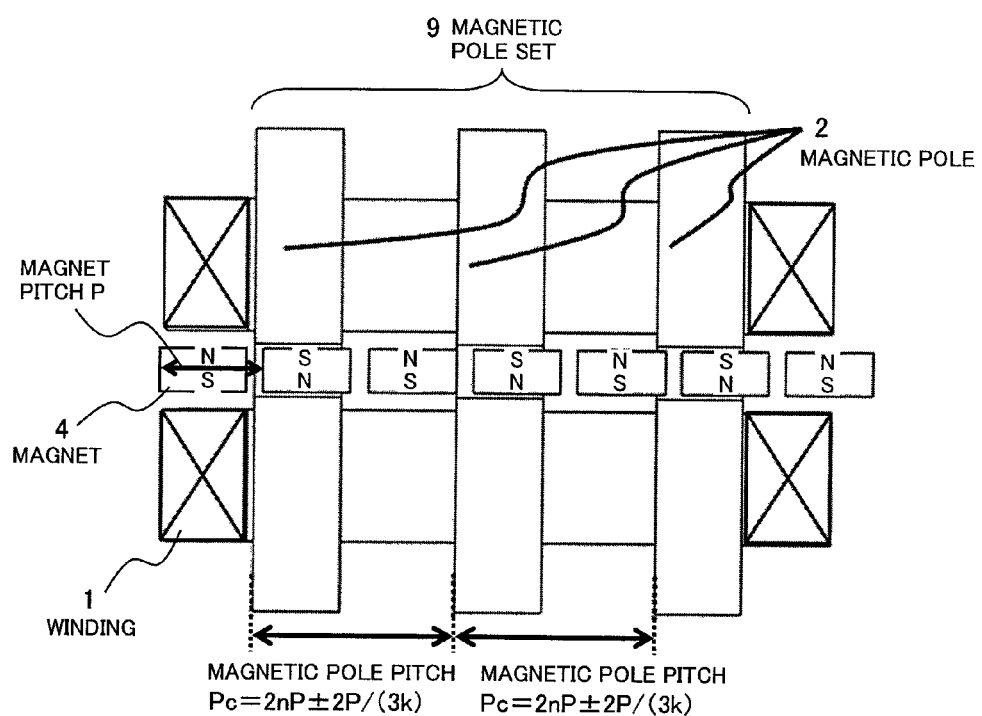
FIG. 4 is a sectional view of the armature unit of the linear motor of which the magnetic pole pair is made up of three magnetic poles in accordance with embodiment 1 of the present invention cut by a vertical plane parallel to the traveling direction.

FIG. 4 is a sectional view of the armature unit of the linear motor of which a magnetic pole pair is made up of three magnetic poles in accordance with embodiment 1 of the present invention cut by a vertical plane parallel to the traveling direction. In this case, the magnetic pole pitch (Pc) becomes Pc=2nP+2P/(3k) or Pc=2nP−2P/(3k).

By constituting the armature unit in this way, the thrust ripple of the linear motor can be reduced, and the degradation of the thrust can be controlled to be small.

Also, it is possible to constitute the armature unit with the magnetic pole pairs (9) having different magnetic pole numbers such as the magnetic pole pair (9) made up of two magnetic poles (2) and the magnetic pole pair (9) made up of three magnetic poles (2). By combining the armature units constituted in this way, a poly-phase linear motor can be constituted.

Figure 5:
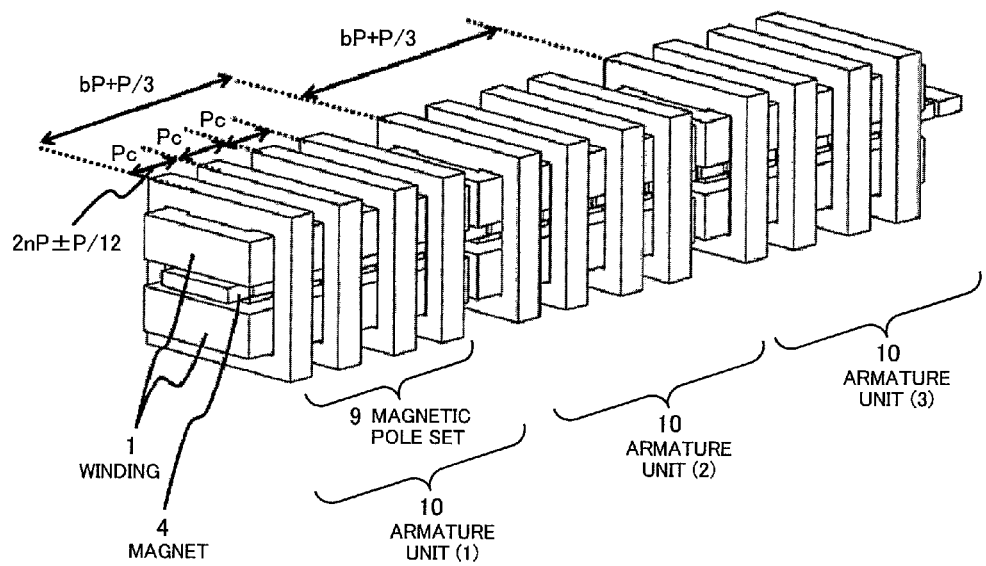
FIG. 5 is a perspective view of the armature units constituting a three-phase linear motor of which the magnetic pole pair is made up of four magnetic poles in accordance with embodiment 1 of the present invention.

FIG. 5 is a perspective view of armature units (10) constituting a three-phase linear motor of which magnetic pole pair (9) is made up of four magnetic poles in accordance with embodiment 1 of the present invention. When q=4 and k=6, the magnetic pole pitch (Pc) becomes Pc=2nP±P/12. Also, it is possible to constitute the three-phase motor by making the pitch between adjacent armature units (10) to be bP+P/3 or bP+2P/3.

Embodiment 2

When a M-phase linear motor is constituted, magnetic pole pitch (Pc) is made to be Pc=2nP±P/(qkM). In the formula described above, n=1, 2, 3, . . . , k=1, 2, 3, . . . , q is number of magnetic poles constituting a magnetic pole pair, and M is the phase number. By constituting the linear motor in this way, the main ripple components of the M-phase linear motor can be reduced.

Figure 6:
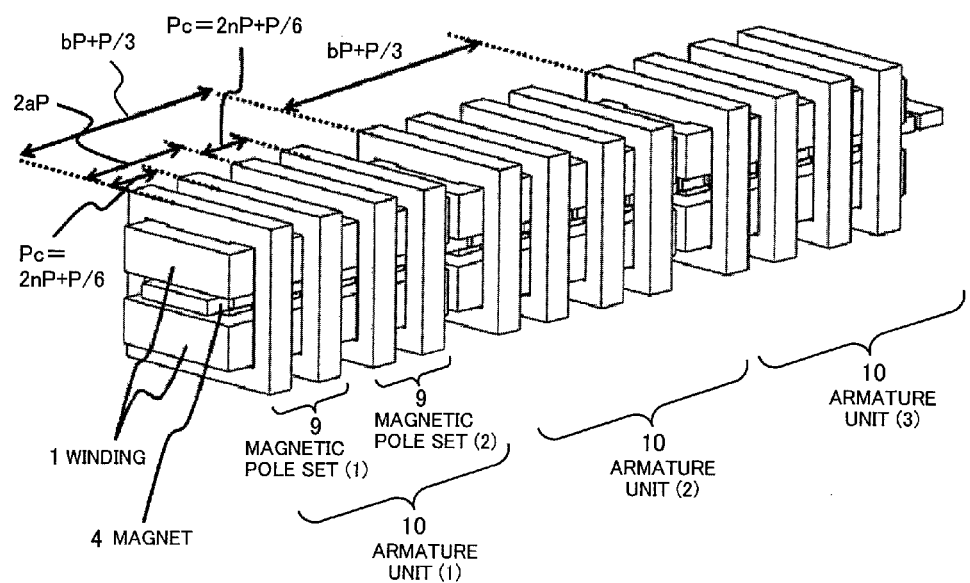
FIG. 6 is a perspective view of a three-phase linear motor having armature units, each armature unit is made up of two magnetic pole pairs, and each magnetic pole pair is made up of two magnetic poles, in accordance with embodiment 2 of the present invention.

FIG. 6 is a perspective view of a three-phase linear motor having armature units, each armature unit is made up of two magnetic pole pairs, and each magnetic pole pair is made up of two magnetic poles (2), in accordance with embodiment 2 of the present invention. When q=2, k=1, and M=3, the magnetic pole pitch (Pc) becomes Pc=2nP±P/6. The magnetic pole pairs can also be arranged with an interval of 2aP.

Embodiment 3

In the case of armature units (10) having plural magnetic pole pairs (9), different orders of thrust ripple can be reduced.

Figure 7:
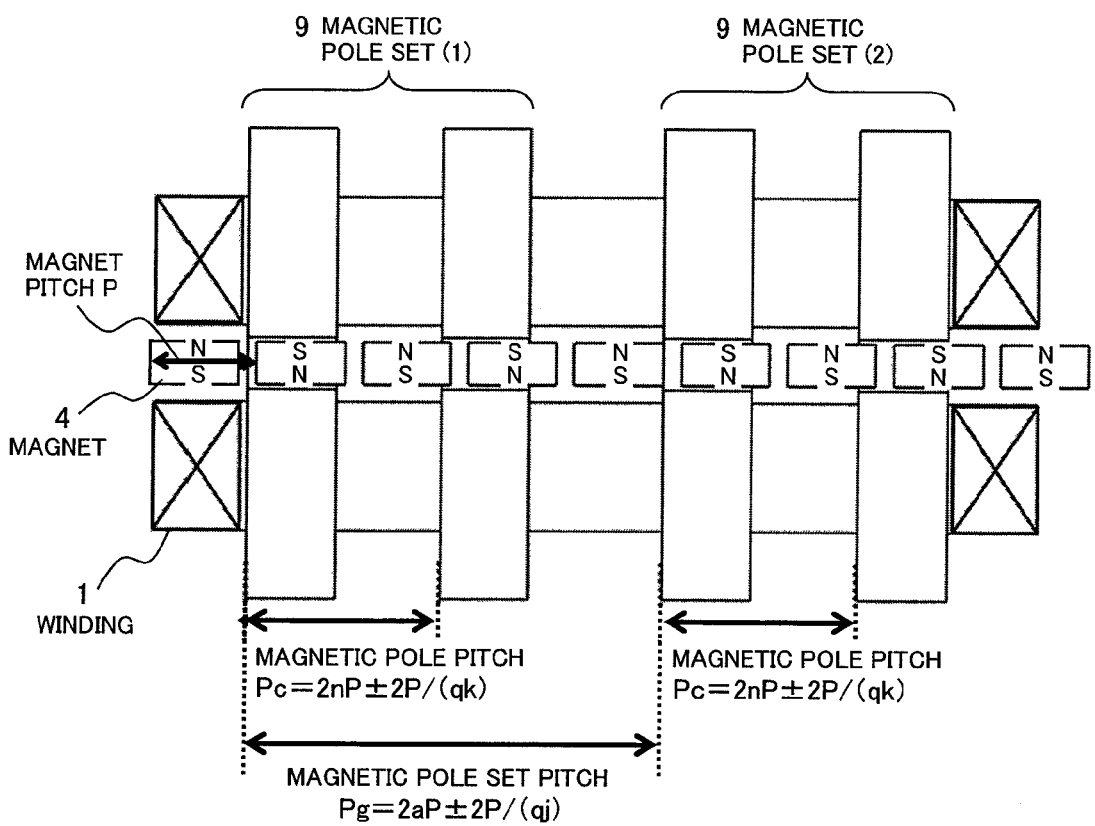
FIG. 7 is a sectional view of an armature unit of a linear motor in accordance with embodiment 3 of the present invention cut by a vertical plane parallel to the traveling direction.

FIG. 7 is a sectional view of an armature unit of a linear motor in accordance with embodiment 3 of the present invention cut by a vertical plane parallel to the traveling direction. When each magnetic pole pitch (Pc) of magnetic pole pair (1) and magnetic pole pair (2) is Pc=2nP±2p/(qk), magnetic pole pair pitch (Pg) is Pg=2aP±2P/(qj), and k is not equal to j, the thrust ripple having two order components can be reduced. For example, in the case of k=6 and j=12, the 6th component and 12th component of the thrust ripple can be reduced. In the case of k=j, the ripple of the same order is reduced. In this case, the reduction is more effective when the magnetic pole numbers of both magnetic pole pairs are the same, but the reduction effect can be obtained even if the magnetic pole numbers are different.

Figure 8:
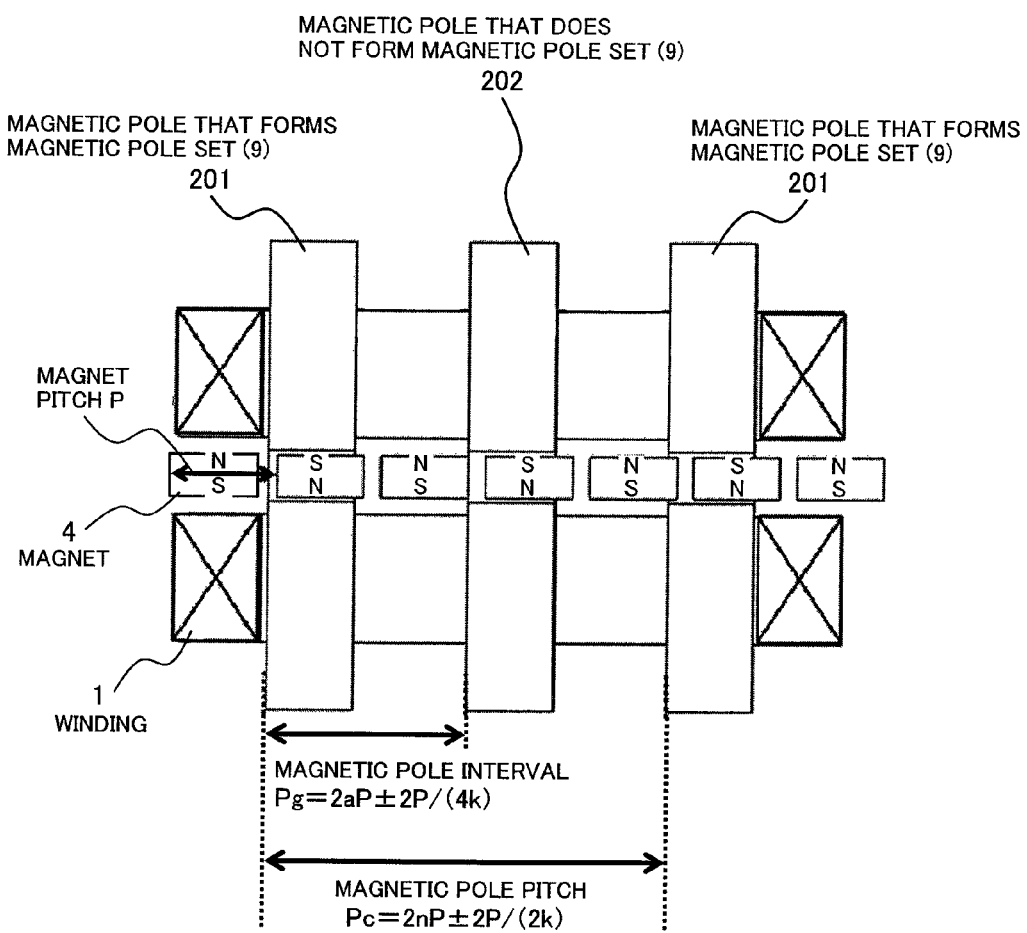
FIG. 8 is a sectional view of an armature unit of a linear motor in accordance with a modification of embodiment 3 of the present invention cut by a vertical plane parallel to the traveling direction.

FIG. 8 is a sectional view of an armature unit of a linear motor in accordance with a modification of embodiment 3 of the present invention cut by a vertical plane parallel to the traveling direction. As shown in the drawing, it is more effective to make all of the magnetic poles (2) constituting the armature unit to be magnetic poles (201) that form the magnetic pole pairs (9), but there are some magnetic poles (202) that do not form the magnetic pole pairs (9) for structural reasons etc. In this case, arrangement is made in such a way that magnetic pole pitch (Pc) within the magnetic pole pairs (9) is Pc=2nP±2P/(2k), and the interval between the magnetic pole (202) that does not form the magnetic pole pair (9) and the adjacent magnetic pole (201), that is, magnetic pole pair pitch (Pg) is Pg=2aP±2P/(4k). Alternatively, the interval between the magnetic pole (202) that does not form the magnetic pole pair (9) and the adjacent pole (201) may be any value in the arrangement. In this case, the ripple reduction effect of the magnetic poles (201) that form the magnetic pole pairs (9) can be obtained similarly.

Embodiment 4

Figure 9:
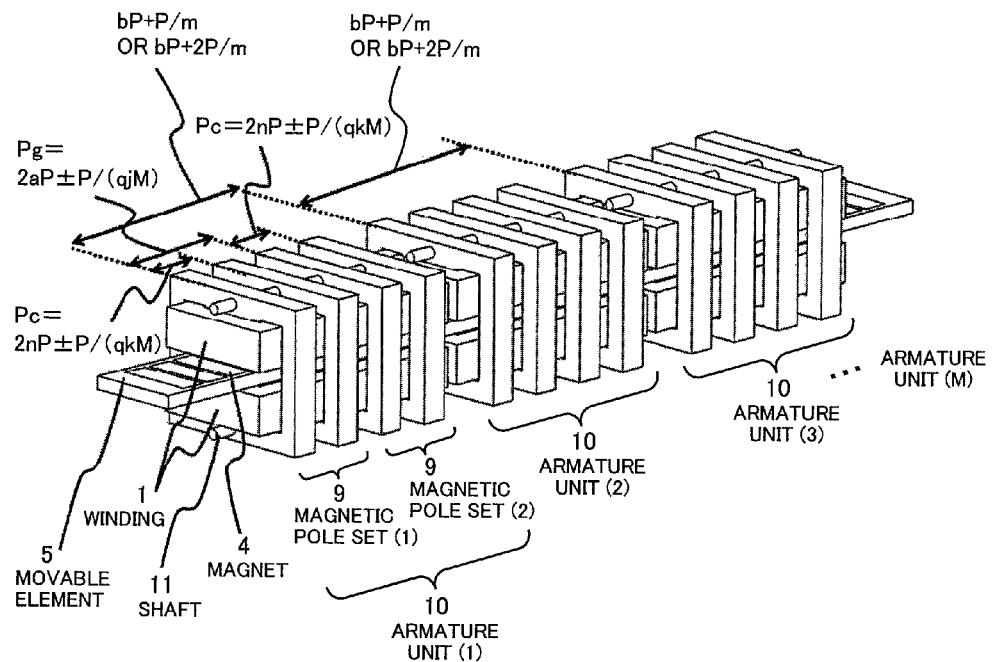
FIG. 9 is a perspective view of a three-phase linear motor having armature units, each armature unit is made up of two magnetic pole pairs, and each magnetic pole pair is made up of two magnetic poles, in accordance with embodiment 4 of the present invention.

FIG. 9 is a perspective view of an M-phase linear motor having armature units, each armature unit is made up of two magnetic pole pairs, and each magnetic pole pair is made up of two magnetic poles, in accordance with embodiment 4 of the present invention. The constitution to reduce the main ripple components will be explained. When magnetic pole pitch (Pc) within each magnetic pole pair is Pc=2nP±P/(qkM), magnetic pole pair pitch (Pg) is Pg=2aP±2P/(qjM), and k=1, j=2, the 6th ripple component and 12th ripple component can be reduced simultaneously. As described above, by combining magnetic pole pairs, plural order components of thrust ripple can be reduced. Accordingly, by arranging magnetic pole pairs depending on the ripple components to be reduced, the reduction effect can be obtained even when the ripple components of plural orders are included. For example, as magnetic pole pitch (Pc), similar effect can be obtained from either of Pc=2nP+P/(qkM) or Pc=2nP−P/(qkM), and arbitrary selection is possible depending on the dimensions of the magnetic poles constituting the magnetic pole pairs and maximum thrust. In this embodiment, magnetic pole arrangement for reducing thrust ripple of two different orders, but by increasing magnetic pole pairs, thrust ripple of further different orders can be reduced.

Combinations of magnetic pole pairs shown in FIG. 3 through FIG. 9 are examples of constitution, and constitution can be made with combinations of other magnetic pole numbers and with magnetic pole pairs of which intervals are widened on purpose. In addition, explanation is made about the case of one or two of the magnetic pole pairs, but the number of the magnetic pole pairs is not limited to these, and plural magnetic pole pairs of different magnetic pole numbers can be used.

Embodiment 5

Figure 10:
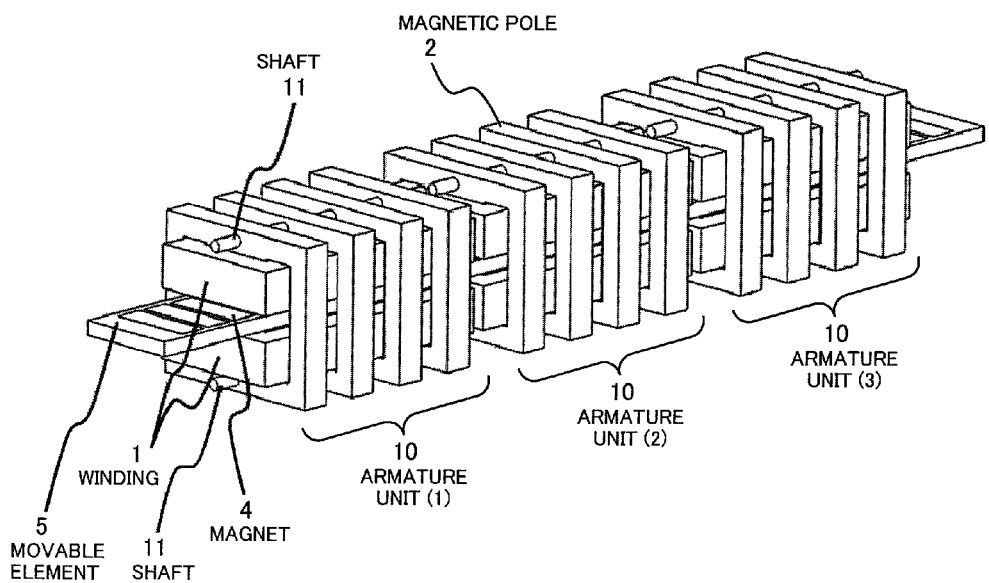
FIG. 10 is a perspective view of armature units constituting a three-phase linear motor of which the magnetic pole pair is made up of four magnetic poles in accordance with embodiment 5 of the present invention.

FIG. 10 is a perspective view of armature units (10) constituting a three-phase linear motor of which the magnetic pole pair is made up of four magnetic poles in accordance with embodiment 5 of the present invention. The drawing shows a case where a mover (5) on which a magnet row is arranged and magnetic pole pairs are retained by shafts (11). The magnets (4) are arranged on the ladder shaped mover (5), and the magnets unified with the movers (5) can move relative to the magnetic poles (2). Also, all of the magnetic poles (2) within each armature unit (10) are connected by shafts (11). And if correlation between magnetic poles (2) is kept, any support means of the magnetic poles (2) can be used. For example, if movement for changing intervals between magnetic pole pairs is made possible through the shafts (11), constitution with any magnetic pole pitch (Pc) becomes possible. By making the position of the magnetic poles (2) movable as described above, control of thrust ripple becomes possible. Control of thrust ripple due to unevenness of material characteristics and dimension accuracy of components also becomes possible.

Embodiment 6

Figure 11:
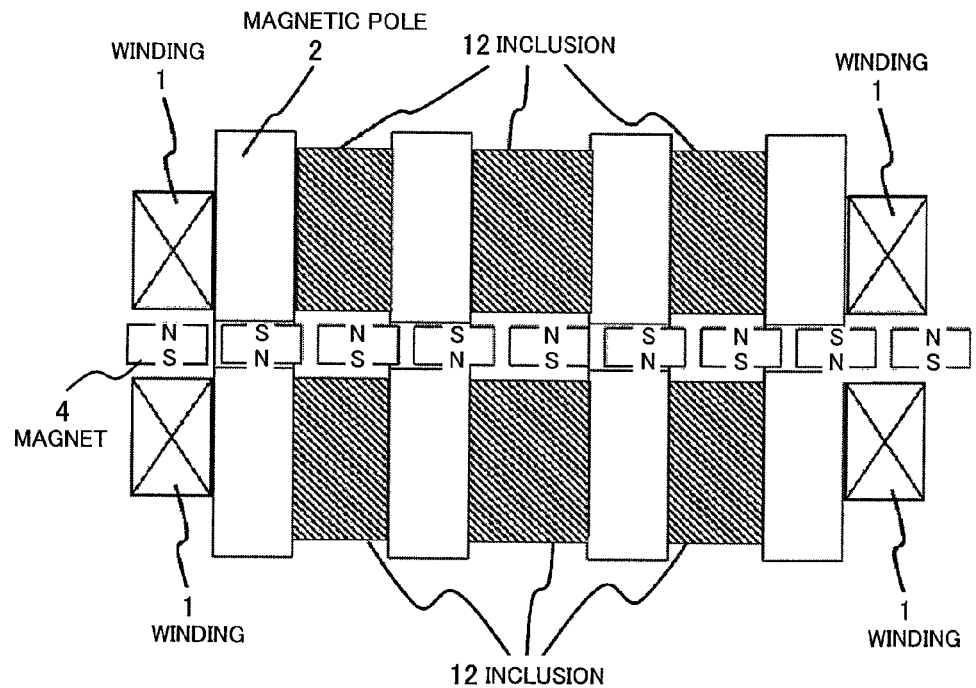
FIG. 11 is a sectional view of an armature unit of a linear motor in accordance with embodiment 6 of the present invention cut by a vertical plane parallel to the traveling direction.

FIG. 11 is a sectional view of an armature unit of a linear motor in accordance with embodiment 6 of the present invention cut by a vertical plane parallel to the traveling direction. The drawing shows the armature unit having inclusions intervening between magnetic poles. By putting the inclusions (12) between the magnetic poles, the positions of the magnetic poles can be stable, and by changing the dimensions of the inclusions, the magnetic poles can be arranged at arbitrary intervals. By adjusting the thickness of the inclusions (12), small ripples can also be controlled and thrust ripples can be further reduced. Moreover, by devising the shape of the inclusions (12), the positions of the magnetic poles can be changed easily even after the linear motor has been assembled. The inclusions between magnetic poles (12) can be constituted as one or constituted with plural members. In addition, the inclusions can be adjusted to an arbitrary thickness by combining thin plates having different thicknesses.

Embodiment 7

Figure 12:
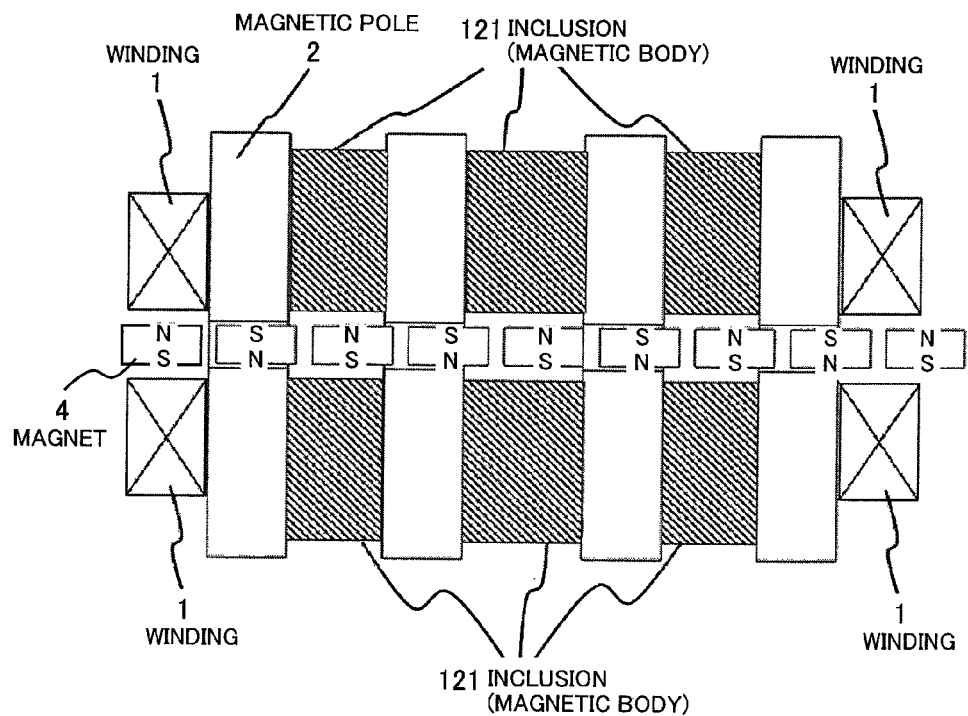
FIG. 12 is a sectional view of an armature unit of a linear motor in accordance with embodiment 7 of the present invention cut by a vertical plane parallel to the traveling direction.

FIG. 12 is a sectional view of an armature unit of a linear motor in accordance with embodiment 7 of the present invention cut by a vertical plane parallel to the traveling direction. In the armature unit, inclusions between magnetic poles made of a magnetic material (121) are used. Since the directions of magnetic flux of the adjacent magnetic poles (2) within the armature unit are identical with each other, the inclusions between magnetic poles made of a magnetic material (121) can be used. When the inclusions between magnetic poles are constituted with magnetic material, the cross-section area of the magnetic flux path is enlarged, whereby improvement of characteristics, reduction of magnetic reluctance, and miniaturization are enabled.

Figure 13:
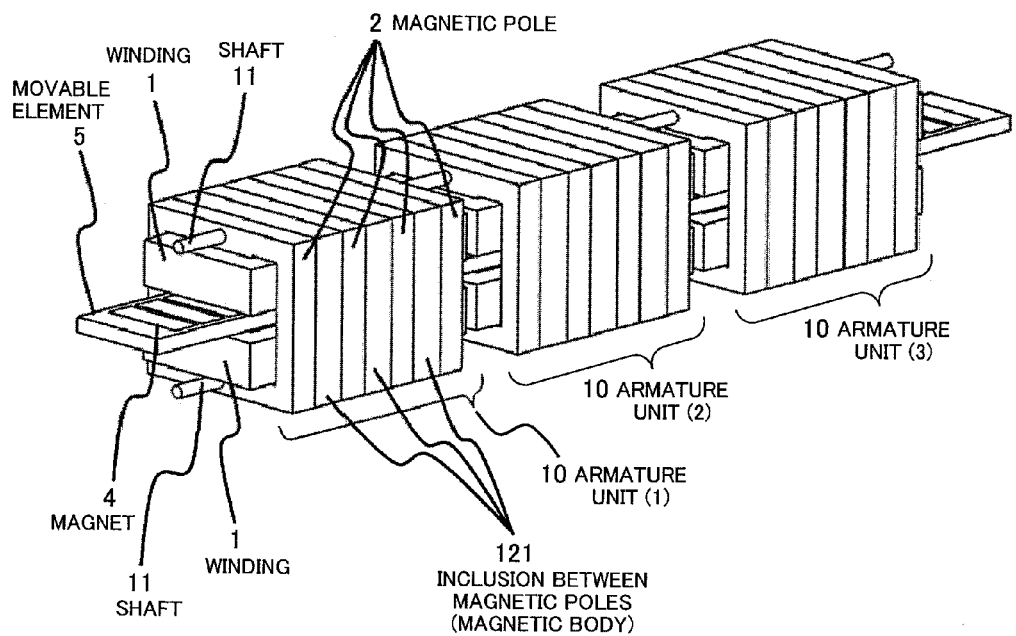
FIG. 13 is a perspective view of an armature unit of a linear motor in accordance with embodiment 7 of the present invention.

FIG. 13 is a perspective view of an armature unit, which is constituted by putting inclusions between magnetic poles, of a three-phase linear motor in accordance with embodiment 7 of the present invention. The three-phase linear motor can be constituted by lining up three armature units (10) in which the inclusions between magnetic poles (magnetic material) (121) having an arbitrary thickness are put between the magnetic poles (2). Intervals between the magnetic poles can be adjusted arbitrarily by putting the inclusions between magnetic poles (121) having an arbitrary thickness between the magnetic poles (2), threading shafts (11) through the inclusions, and tightening the inclusions.

Embodiment 8

Figure 14:
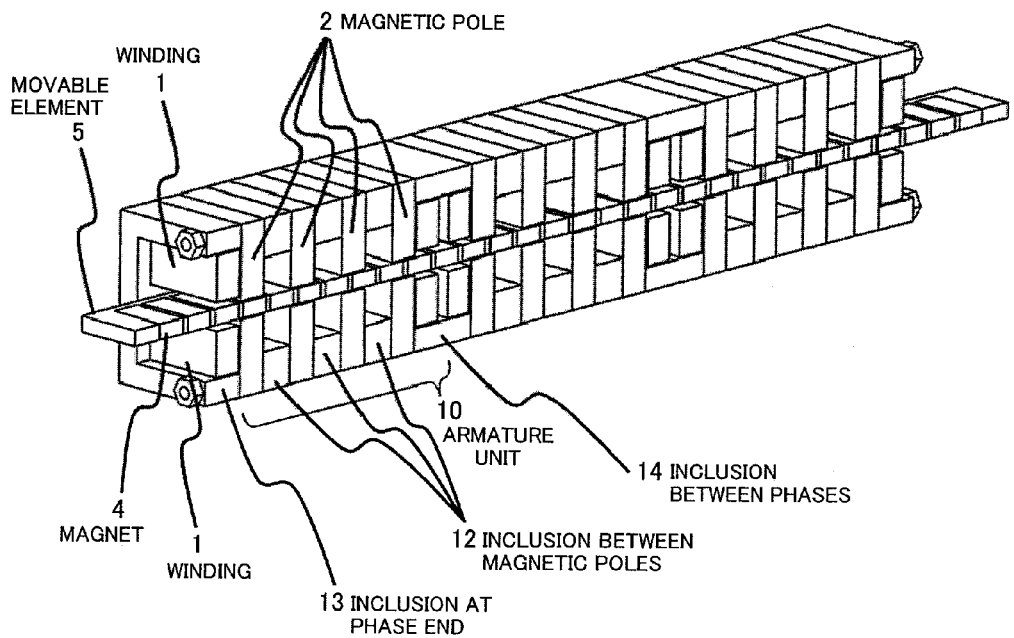
FIG. 14 is a perspective view of an armature unit of a linear motor in accordance with embodiment 8 of the present invention cut by a vertical plane parallel to the traveling direction.

FIG. 14 is a perspective view of an armature unit of a linear motor in accordance with embodiment 8 of the present invention cut by a vertical plane parallel to the traveling direction. A three-phase linear motor is constituted with the armature units to which inclusions at phase ends (13) and inclusions between phases (14) are arranged. By arranging the inclusions at phase ends (13), winding(s) (1) can be protected, whereby damage to the winding is prevented. Moreover, danger of contacting winding(s) (1) at an elevated temperature can be reduced. And the inclusions at phase ends (13) can also be used as members to retain the winding(s) (1). The inclusions between phases (14) have similar effects as the inclusions at phase ends (13), and, in addition, by adjusting the thickness of the inclusions between phases (14), intervals between the armature units can be adjusted.

Embodiment 9

Figure 15:
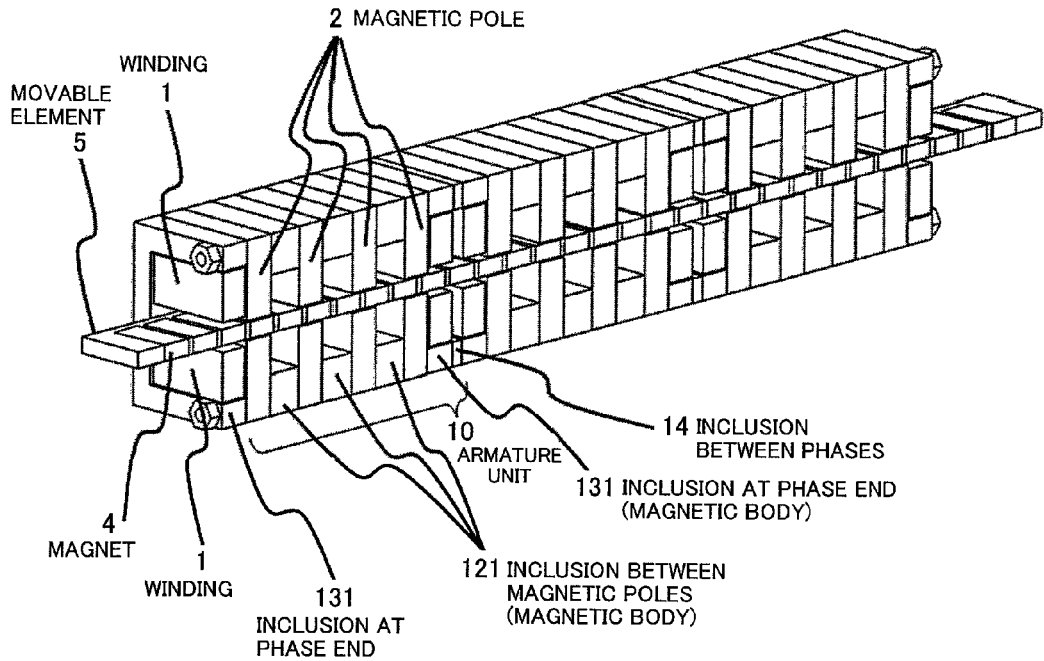
FIG. 15 is a sectional perspective view of an armature unit of a linear motor in accordance with embodiment 9 of the present invention cut by a vertical plane parallel to the traveling direction.

FIG. 15 is a perspective view of an armature unit of a linear motor in accordance with embodiment 9 of the present invention cut by a vertical plane parallel to the traveling direction. The linear motor is a three-phase linear motor in which inclusions at phase ends (magnetic material) (131) are arranged at both ends of the armature units (10) and inclusions between phases (14) are arranged between the armature units (10). Since the directions of magnetic poles (2) within the armature units (10) are identical with each other, by changing the material of the inclusions at phase ends (magnetic material) (131) to a member having magnetic property, the cross-section area of the magnetic flux path is enlarged, whereby improvement of characteristics, reduction of magnetic reluctance, and miniaturization are enabled. Inclusions between magnetic poles (magnetic material) (121), the inclusions at phase ends (magnetic material) (131), and the inclusions between phases (14) can be constituted by inserting cylindrical inclusions or quadrangular members. Any shape of the inclusions is accepted unless the traveling of the mover (5) is prevented due to the shape.

Embodiment 10

Figure 16:
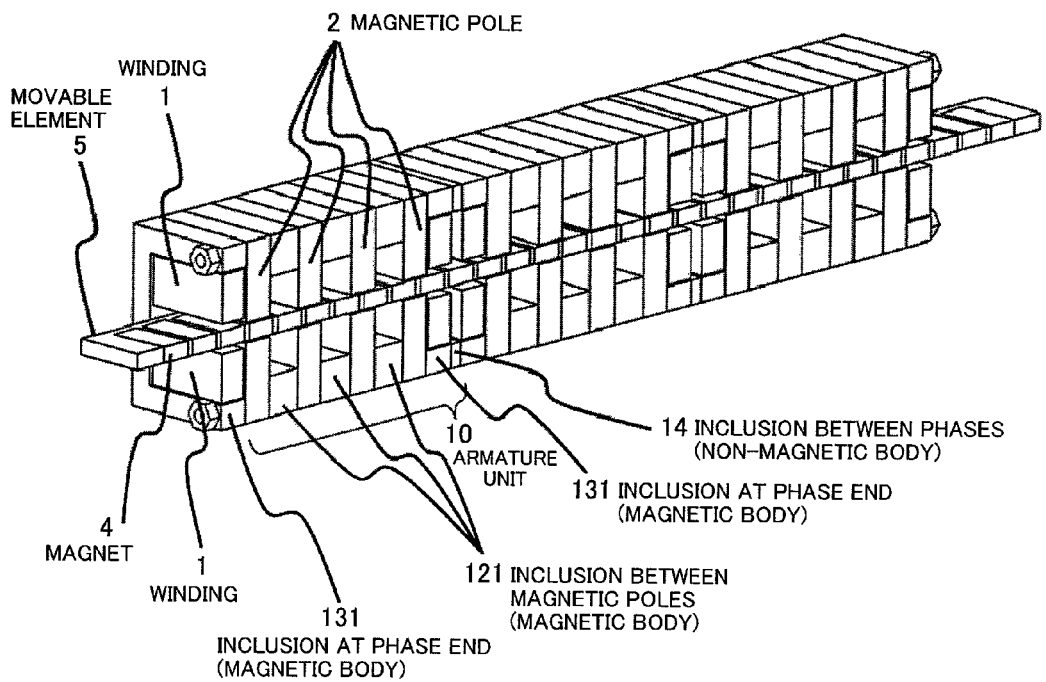
FIG. 16 is a sectional perspective view of an armature unit of a linear motor in accordance with embodiment 10 of the present invention cut by a vertical plane parallel to the traveling direction.

FIG. 16 is a sectional perspective view of an armature unit of a linear motor in accordance with embodiment 10 of the present invention cut by a vertical plane parallel to the traveling direction. The linear motor is a three-phase linear motor of which inclusions between phases (14) are non-magnetic bodies. By making the inclusions between phases (14) non-magnetic bodies, magnetic interference between the armature units is reduced. In addition, by adjusting the thickness etc. of the inclusions between phases (14), the thrust ripple can be reduced. Any shape of the inclusions between phases (14) is accepted if the inclusions are non-magnetic bodies. And any state such as solid, liquid, or gas is accepted. Material having the lowest possible permeability is preferable for the inclusions between phases (14).

Embodiment 11

Figure 17:
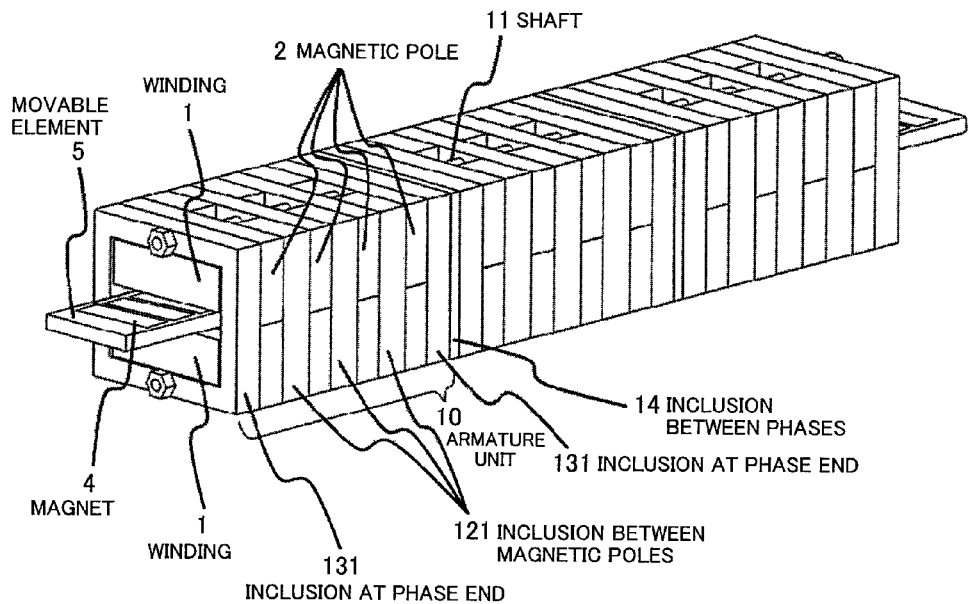
FIG. 17 is a perspective view of an armature unit of a linear motor in accordance with embodiment 11 of the present invention.

FIG. 17 is a perspective view of an armature unit of a linear motor in accordance with embodiment 11 of the present invention. The drawing shows an example of a three-phase linear motor of which inclusions between magnetic poles (121) are constituted to be U-shaped. If the inclusions between magnetic poles (121) are made to be U-shaped, the inclusions between magnetic poles (121) can be inserted without pulling out shafts (11) when adjusting intervals between the magnetic poles. In addition, by pulling out the U-shaped inclusions between magnetic poles (121), the state of winding(s) (1) and magnets (4) can easily be checked. Moreover, vertical ventilation of the magnet (4) row and inside of the winding(s) (1) is improved, whereby the magnet (4) and the winding (1) are cooled easily. And even when the inclusions between magnetic poles (121) are not U-shaped, by dividing the inclusions between magnetic poles (121), the work can be done without pulling out the shafts (11).

Figure 18:
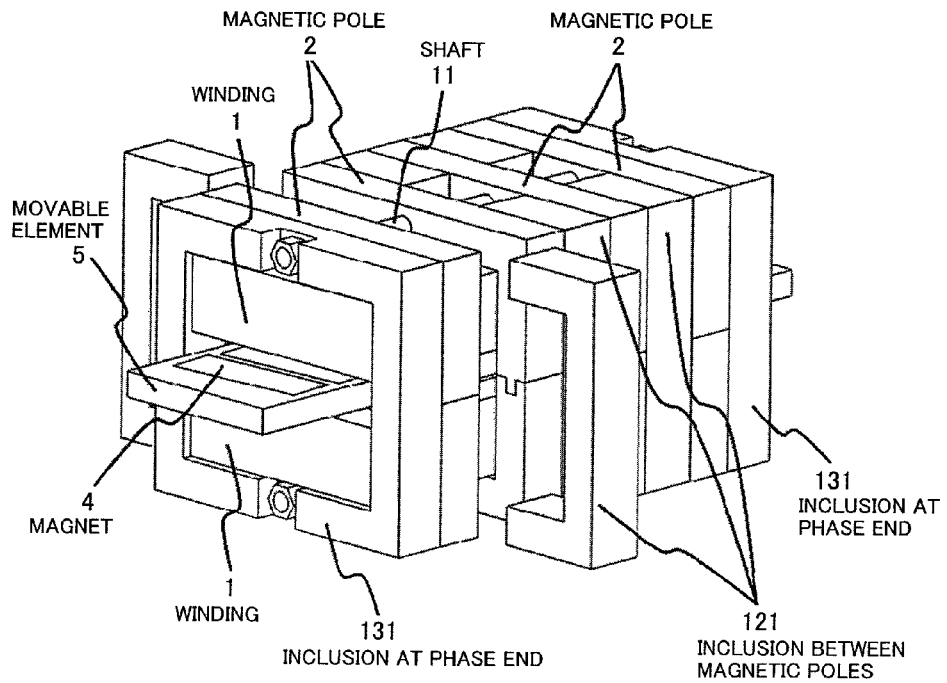
FIG. 18 is a partly exploded perspective view of the armature unit of the linear motor in accordance with embodiment 11 of the present invention.

FIG. 18 is a partly exploded perspective view of the armature unit of the linear motor in accordance with embodiment 11 of the present invention. The drawing shows a situation in which a pair of U-shaped inclusions between magnetic poles (121) is pulled out. The divided inclusions between magnetic poles (121) can easily be pulled out in the lateral direction.

Figure 19:
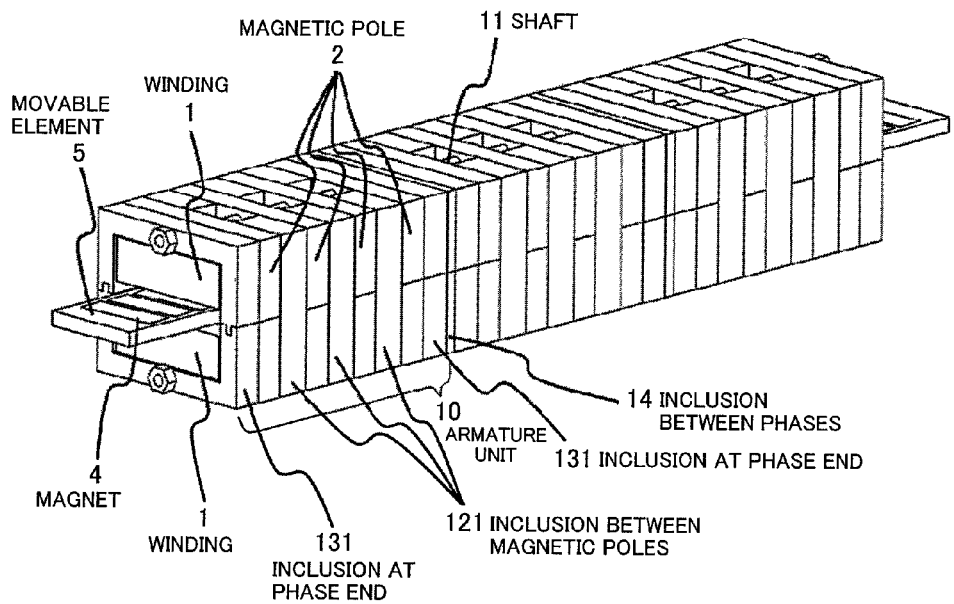
FIG. 19 is a perspective view of the armature unit of the linear motor of which inclusions at phase ends are divided in accordance with embodiment 11 of the present invention.

FIG. 19 is a perspective view of the armature unit of the linear motor of which inclusions at phase end are divided in accordance with embodiment 11 of the present invention. The inclusions at phase ends (131) can also be a divided constitution in a similar way as the inclusions between magnetic poles (121) in FIG. 18. By adopting the constitution described above, advantages such as easy disassembly of the armature units can be obtained.

Embodiment 12

Figure 20:
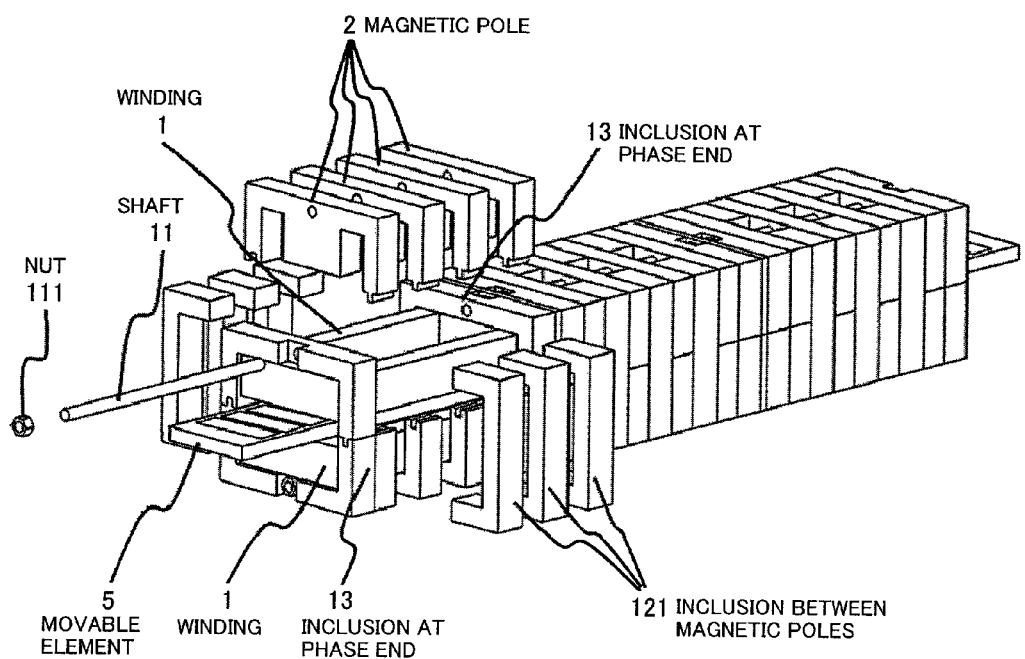
FIG. 20 is a partly exploded perspective view of an armature unit of a linear motor in accordance with embodiment 12 of the present invention.

FIG. 20 is a partly exploded perspective view of an armature unit of a linear motor in accordance with embodiment 11 of the present invention. The drawing shows a three-phase linear motor of which magnetic poles (2) are divided. By dividing magnetic poles (2) at the level of the mover (5) into upper parts and lower parts, the magnetic poles (2) can be disassembled without removing winding(s) (1). Thus replacement of magnetic pole teeth and changing of the pitch of the magnetic poles (2) can be easily done. For example, when the magnetic poles above the mover (5) are changed, by removing the upper shaft (11) and the upper magnetic poles (2), arrangement of the magnetic poles (2) can be changed without removing the winding(s) (1). For example, inclusions between magnetic poles (121) also can be divided into two parts of top and bottom or four parts of left, right, top, and bottom.

Figure 21:
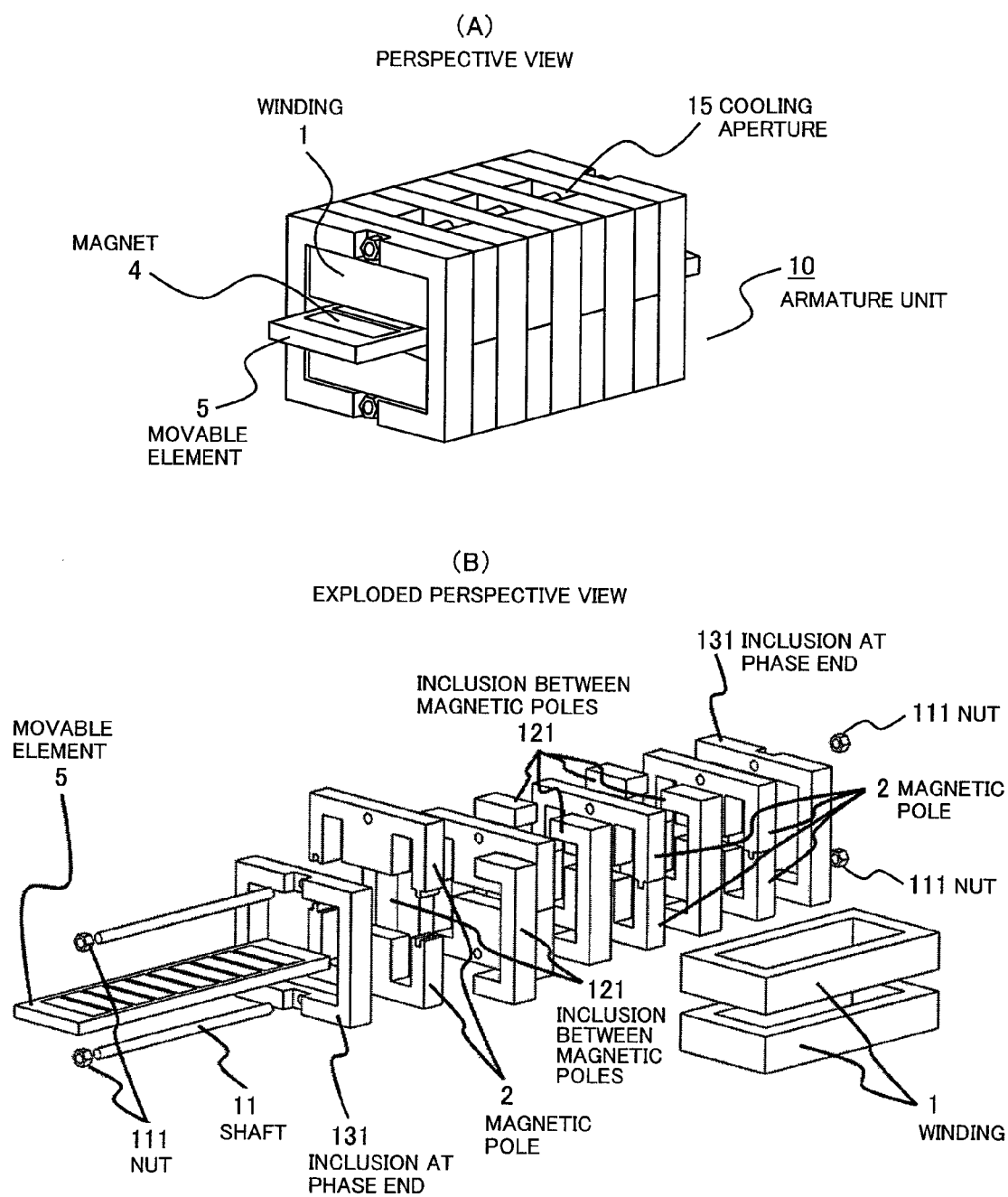
FIG. 21(A) is a perspective view of an armature unit of a linear motor in accordance with embodiment 12 of the present invention.
FIG. 21(B) is an exploded perspective view of the armature unit of the linear motor in accordance with embodiment 12 of the present invention.

FIG. 21A is a perspective view of an armature unit of a linear motor in accordance with embodiment 12 of the present invention. FIG. 21B is an exploded perspective view of the armature unit of the linear motor in accordance with embodiment 12 of the present invention. The armature unit is constituted by putting a plurality of magnetic poles (2) and inclusions between magnetic poles (121) between inclusions at phase ends (131). Vent holes inside of winding(s) (1) and magnets (4) are constituted by some inclusions between magnetic poles (121) and inclusions at phase ends (131) depending on their shapes, and the holes can be used as cooling apertures (15). And by arranging a plurality of the units and fixing them to plates etc., the linear motor can be constituted.

Embodiment 13

Figure 22:
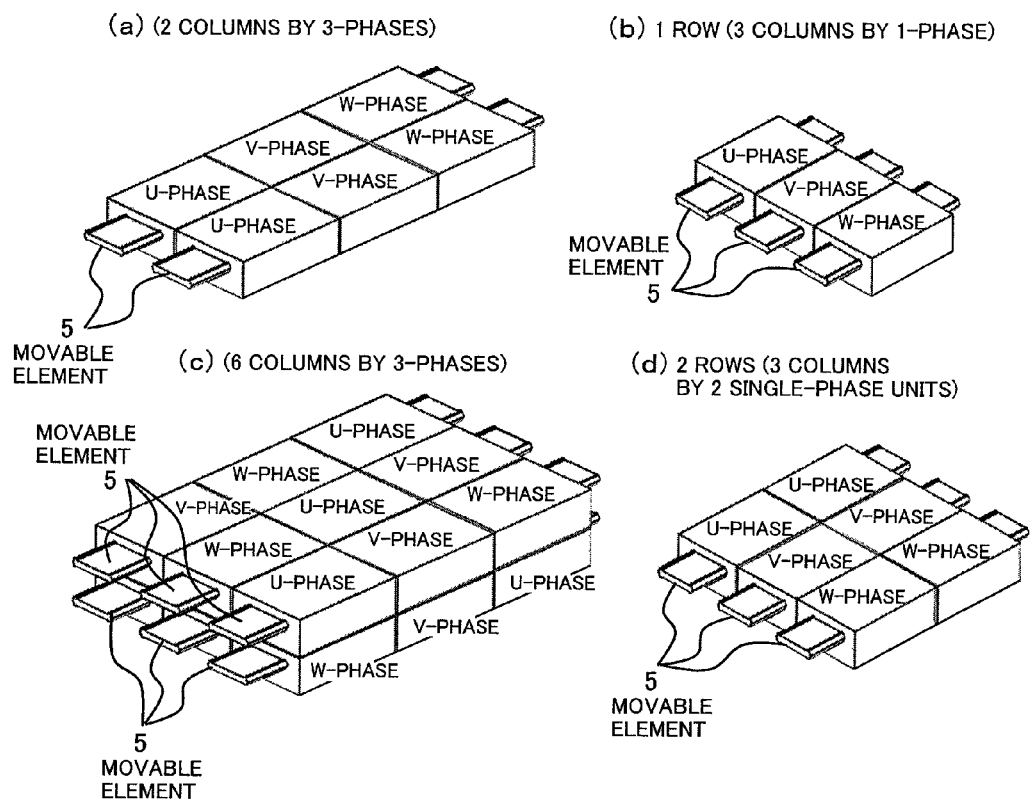
FIG. 22 shows arrangement examples of armature units of a linear motor in accordance with embodiment 13 of the present invention.

FIG. 22 shows arrangement examples of armature units of a linear motor in accordance with embodiment 13 of the present invention. By arranging a plurality of the armature units in such a way that the traveling directions of movers (5) are identical, the linear motor can be constituted. FIG. 22(a) shows an example in which three-phase linear motors are constituted in two columns. By combining the movers (5) in two columns, the linear motor having a large thrust can be constituted with the units of the same shape. In addition, arrangement in the lateral direction can be made as shown in FIG. 22(b). In FIG. 22(c), three-phase linear motors are arranged in six columns, and the arrangement can also be made in such a way that the force generated at each unit is balanced. FIG. 22(d) shows an example of a three-phase linear motor of which one phase is constituted with one shaft and two units.

Embodiment 14

Figure 23:
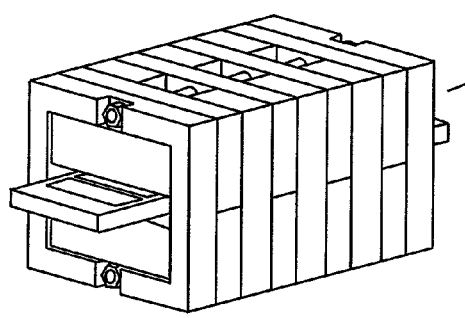
FIG. 23($a$) is a perspective view of the armature unit of the linear motor in accordance with embodiment 13 of the present invention.
Figure 23:
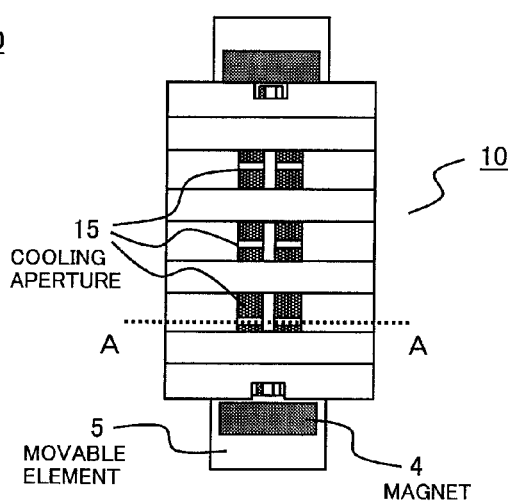
Figure 23:
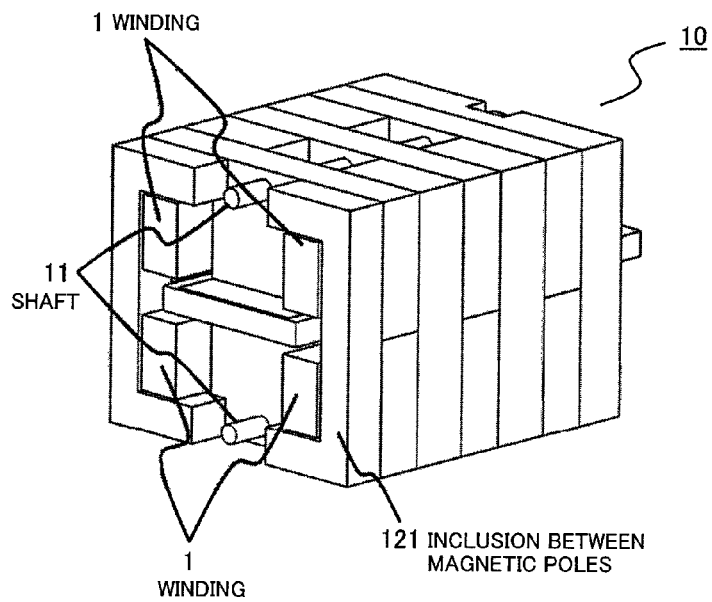

FIG. 23(a) is a perspective view of an armature unit (10) of a linear motor in accordance with embodiment 13 of the present invention; FIG. 23(b) is a top view of the armature unit of the linear motor in accordance with embodiment 13 of the present invention; FIG. 23(c) is a sectional perspective view of the armature unit of the linear motor in accordance with embodiment 13 of the present invention taken along the line A-A of FIG. 23b. The drawing shows the armature unit (10) constituted with U-shaped inclusions between magnetic poles (121). When U-shaped inclusions between magnetic poles (121) are inserted between magnetic poles, paths for a cooling medium are formed to winding(s) (1) and magnets (4) as can be seen from the top view of the armature unit (10) and the sectional perspective view of the armature unit taken along the line A-A, whereby the cooling effect of the winding(s) (1) and the movers (5) is increased. In addition, an advantage is obtained in which the state of the movers (5) and inside of the winding(s) (1) can be confirmed easily.

Embodiment 15

Figure 24:
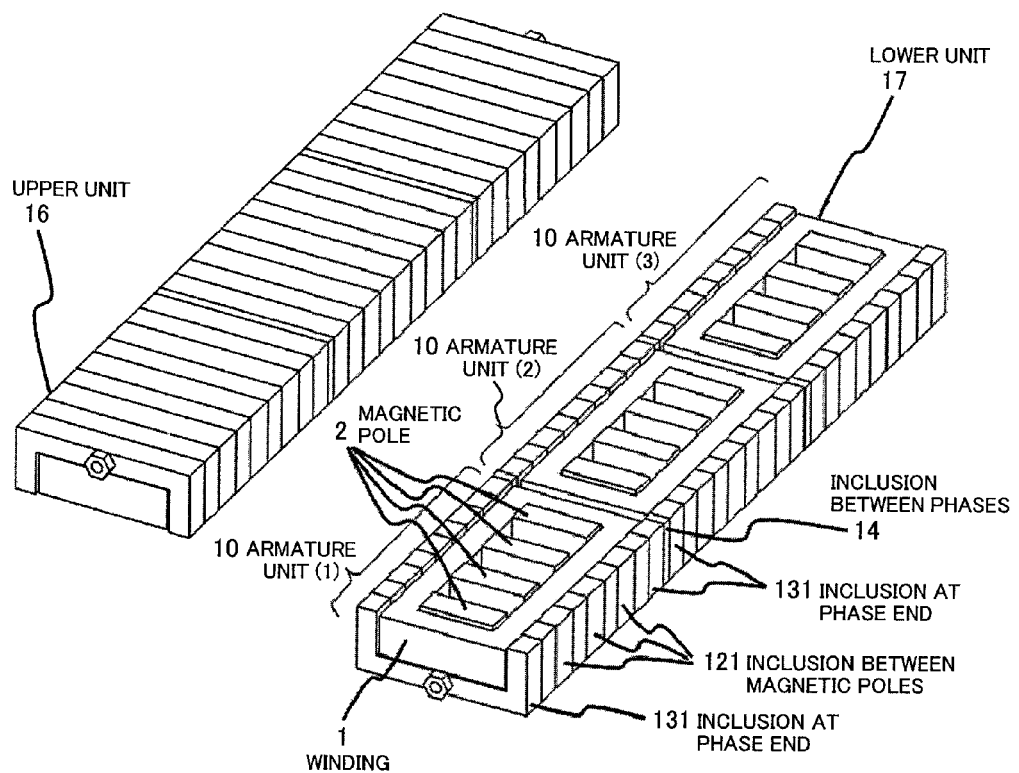
FIG. 24 is an exploded perspective view of an armature unit divided into upper and lower parts of a linear motor in accordance with embodiment 14 of the present invention.

FIG. 24 is an exploded perspective view of an armature unit divided into upper and lower parts of a linear motor in accordance with embodiment 14 of the present invention. As shown in the drawing, inclusions at phase ends (131), inclusions between magnetic poles (121), magnetic poles (2), and inclusions between phases (14) are divided into upper parts and lower parts at the level of movers (5), and winding(s) (1) can be removed easily. In addition, since the upper and lower parts can be manufactured to be the same shape, an advantage is obtained in which the manufacturing cost can be reduced. In FIG. 24, one shaft (11) (not shown) penetrates three armature units (10), but alternatively each unit can be divided into an upper unit (16) and a lower unit (17) by penetrating the shaft (11) per armature unit.

Embodiment 16

Figure 25:
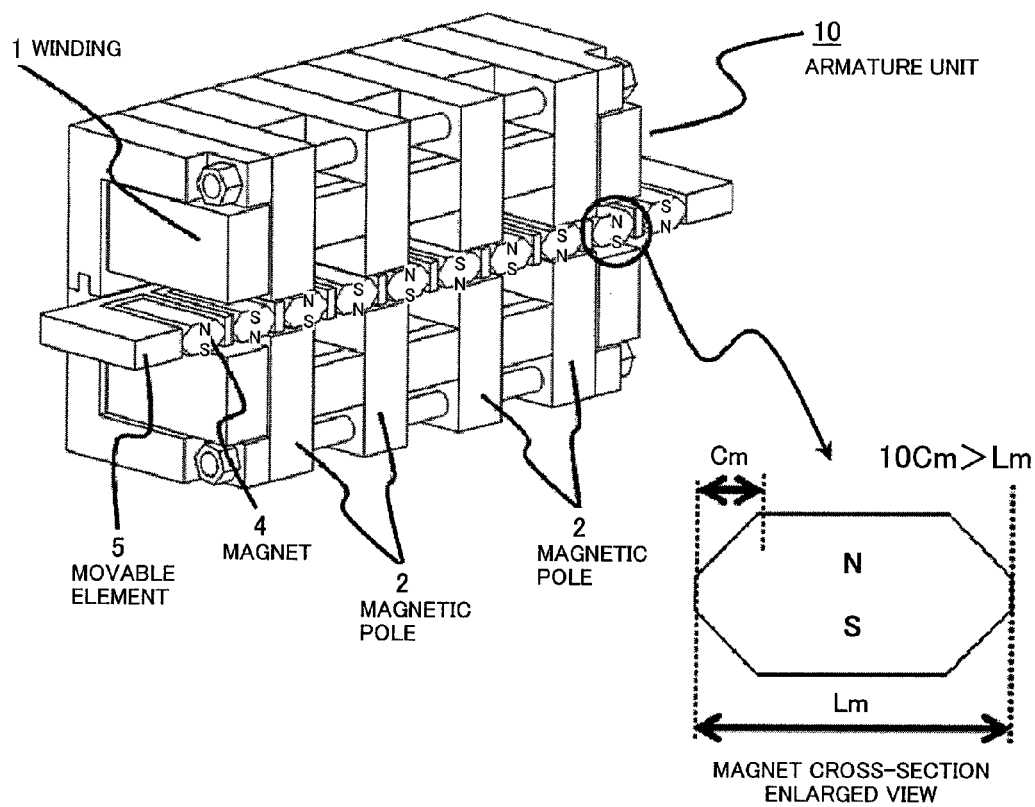
FIG. 25 shows a sectional perspective and a partially enlarged view of an armature unit of a linear motor in accordance with embodiment 15 of the present invention cut by a vertical plane parallel to the traveling direction.

FIG. 25 shows a sectional perspective and a partially enlarged view of an armature unit of a linear motor in accordance with embodiment 15 of the present invention cut by a vertical plane parallel to the traveling direction. The drawing shows the chamfered shape of magnets (4) of a mover (5). When the width of a magnet (4) is Lm, leakage flux of the magnet (4) can be reduced by making the chamfer dimension of corner parts of the magnet (4) Cm to be 10 Cm>Lm. Moreover, the effect to control the thrust ripple can also be obtained. Places to be chamfered can be changed depending on the motion of the mover (5), and all of the specified places are not necessarily chamfered at the same time.

Embodiment 17

Figure 26:
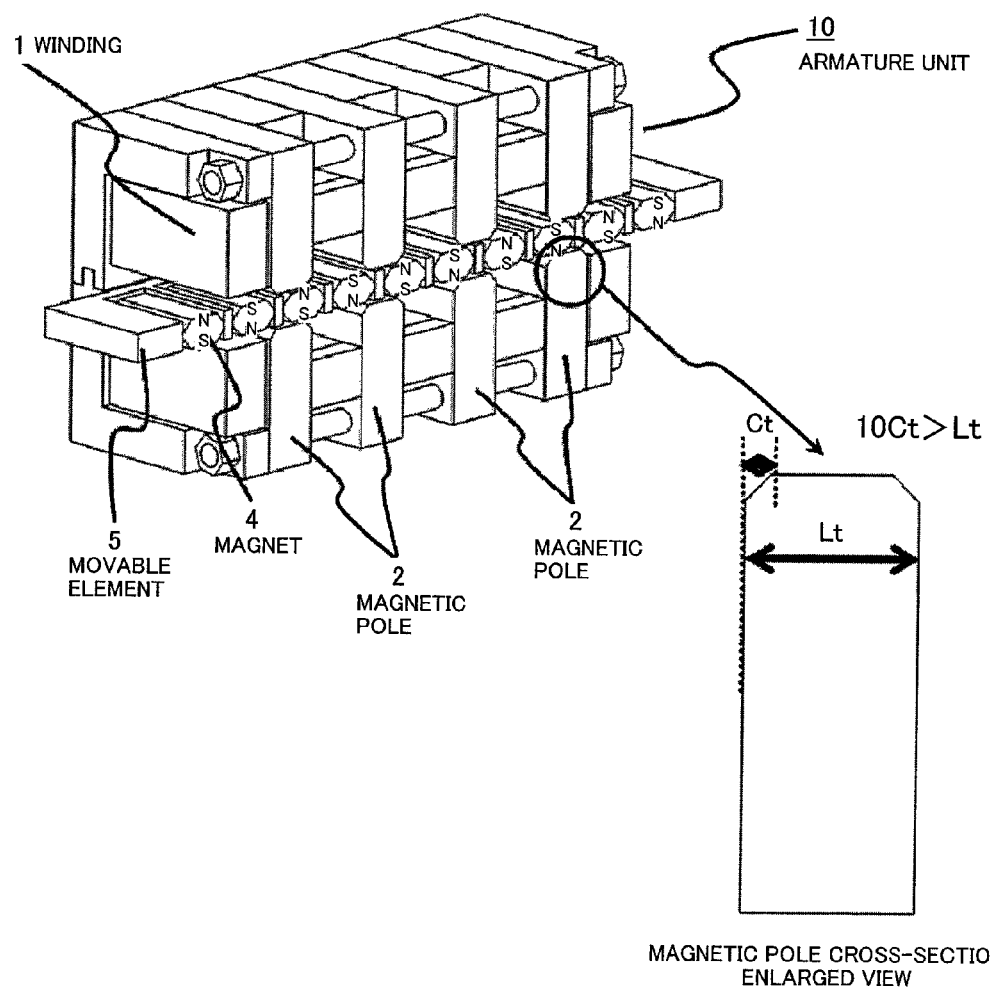
FIG. 26 shows a sectional perspective and a partially enlarged view of an armature unit of a linear motor in accordance with embodiment 16 of the present invention cut by a vertical plane parallel to the traveling direction.

FIG. 26 shows a sectional perspective and a partially enlarged view of an armature unit (10) of a linear motor in accordance with embodiment 16 of the present invention cut by a vertical plane parallel to the traveling direction. The drawing explains the chamfer of corner parts of magnetic poles (2) of the armature unit (10). By determining the chamfer width of the magnetic pole (2) (Ct) against the thickness of the magnetic pole (2) (Lt) to be 10 Ct>Lt, the change of flux becomes moderate, thrust ripple can be controlled, and leakage flux can be reduced. By chamfering the magnet (4) described in FIG. 25 and chamfering the magnetic poles (2) described in FIG. 26 at the same time, effects can be obtained in a synergistic manner. An explanation has been made about the drawings in which the corners of the magnet (4) and the magnet poles (2) are chamfered in a linear fashion, but alternatively corners can be chamfered arcuately or polygonally.

Embodiment 18

Figure 27:
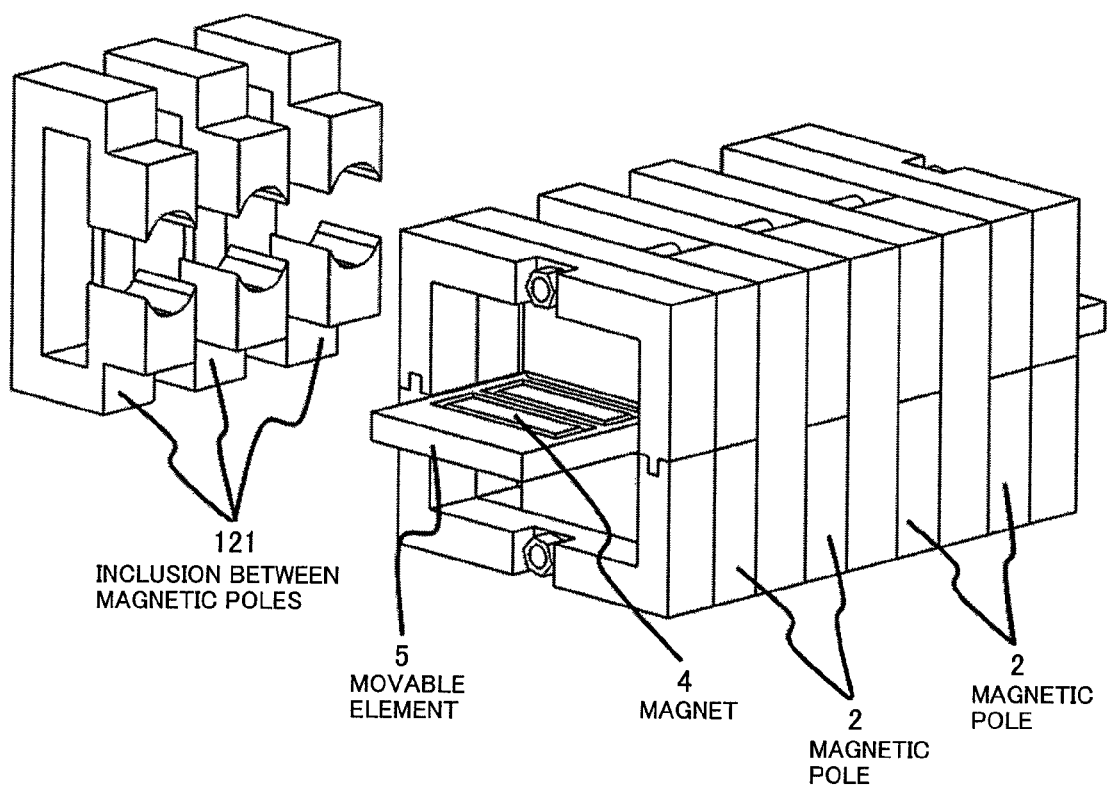
FIG. 27 shows a perspective view of an armature unit of a linear motor and an exploded perspective view of some parts of the armature unit in accordance with embodiment 17 of the present invention.

FIG. 27 shows a perspective view of an armature unit of a linear motor and an exploded perspective view of some parts of the armature unit in accordance with embodiment 17 of the present invention. The drawing shows a constitution in which parts facing magnets (4) of inclusions between magnetic poles (121) are made arcuate. When the inclusions between magnetic poles (121) are constituted with members having magnetic properties, the inclusions between magnetic poles (121) can be constituted as magnetic paths. By changing the shape of parts facing magnets (4) of the inclusions between magnetic poles (121) arcuate or stepwise and devising the shape, leakage flux can be reduced and thrust ripple can be controlled. The shape of the inclusions between magnetic poles (121) is not limited to that of FIG. 27 if the inclusions between magnetic poles (121) are constituted as the magnetic paths or reduce the effects of the ripple.

Figure 28:
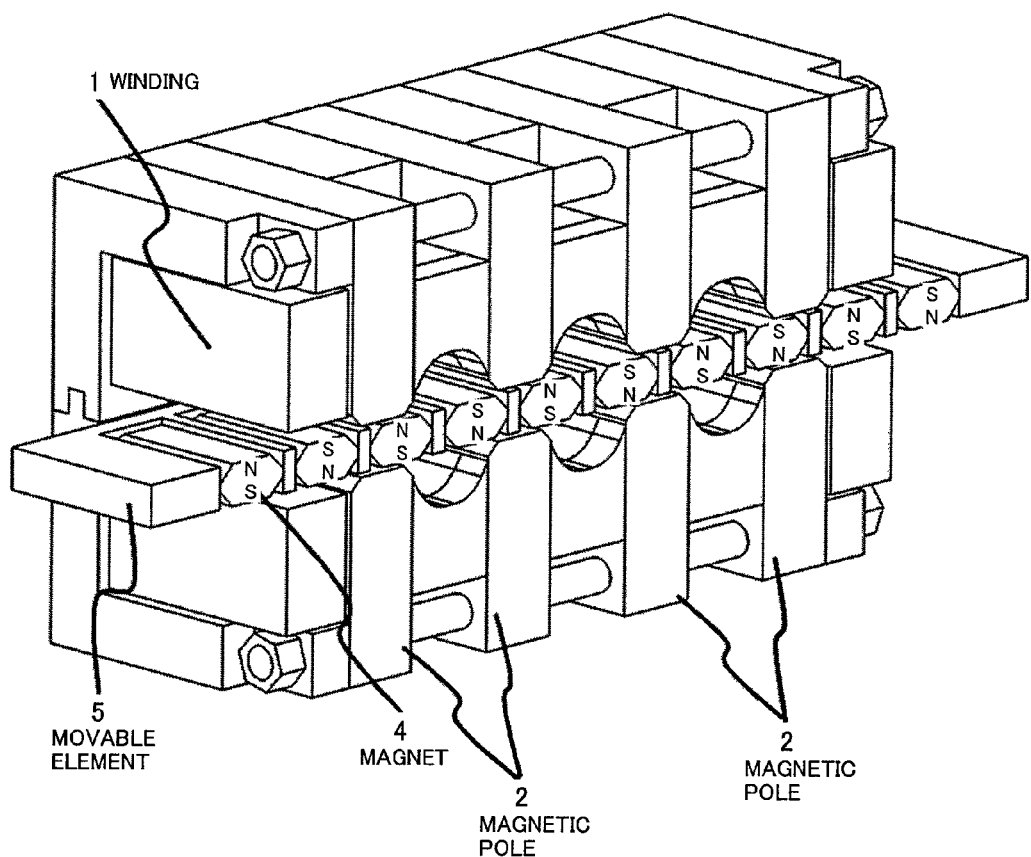
FIG. 28 is a sectional perspective view of the armature unit of the linear motor in accordance with embodiment 17 of the present invention cut by a vertical plane parallel to the traveling direction.

FIG. 28 is a sectional perspective view of the armature unit of the linear motor in accordance with embodiment 17 of the present invention cut by a vertical plane parallel to the traveling direction. The drawing shows an example of the armature unit in which the shape of the parts facing the magnets (4) of the inclusions between magnetic poles (121) is made arcuate and the magnets (4) and the magnetic poles (2) are chamfered.

Embodiment 19

Figure 29:
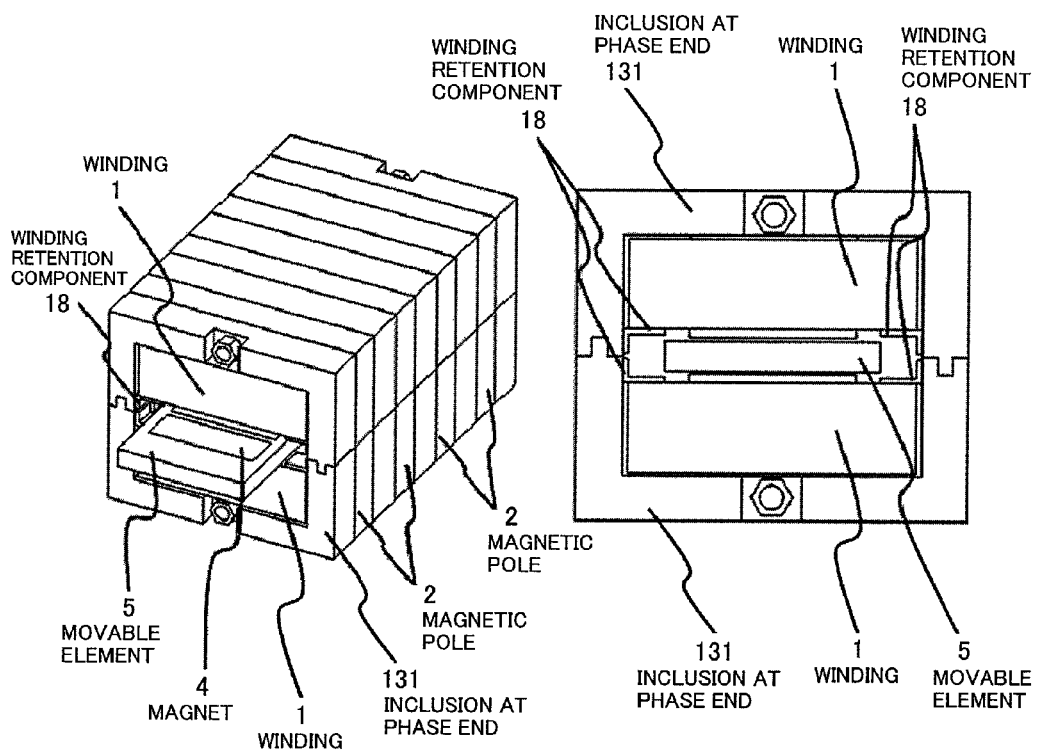
FIG. 29 shows a perspective view and an elevated view of an armature unit of a linear motor in accordance with embodiment 18 of the present invention.

FIG. 29 shows a perspective view and an elevated view of an armature unit of a linear motor in accordance with embodiment 18 of the present invention. The drawing shows an example in which inclusions at phase ends (131), inclusions between magnetic poles (121), and magnetic poles (2) are divided into two parts of top and bottom to constitute an armature unit, and winding retention components (18) are arranged on the inclusions at phase ends (131).

Figure 30:
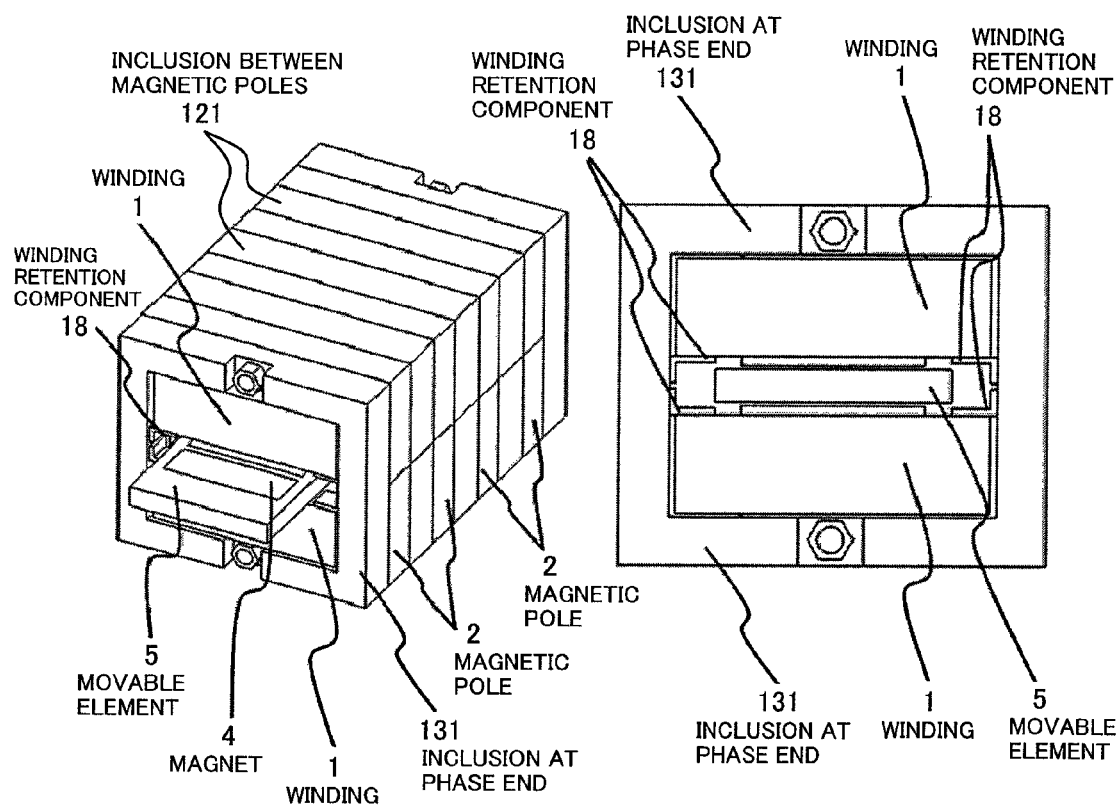
FIG. 30 shows a perspective view and an elevated view of a modification of the armature unit of the linear motor in accordance with embodiment 18 of the present invention.

FIG. 30 shows a perspective view and an elevated view of a modification of the armature unit of the linear motor in accordance with embodiment 18 of the present invention. The difference of this example shown in FIG. 30 from that of FIG. 29 is that the inclusions at phase end (13) are constituted as one, and the inclusions between magnetic poles (121) and the magnetic poles (2) are constituted by being divided into two parts of top and bottom. As described above, the armature unit can be constituted with a plurality of combinations.

Figure 31:
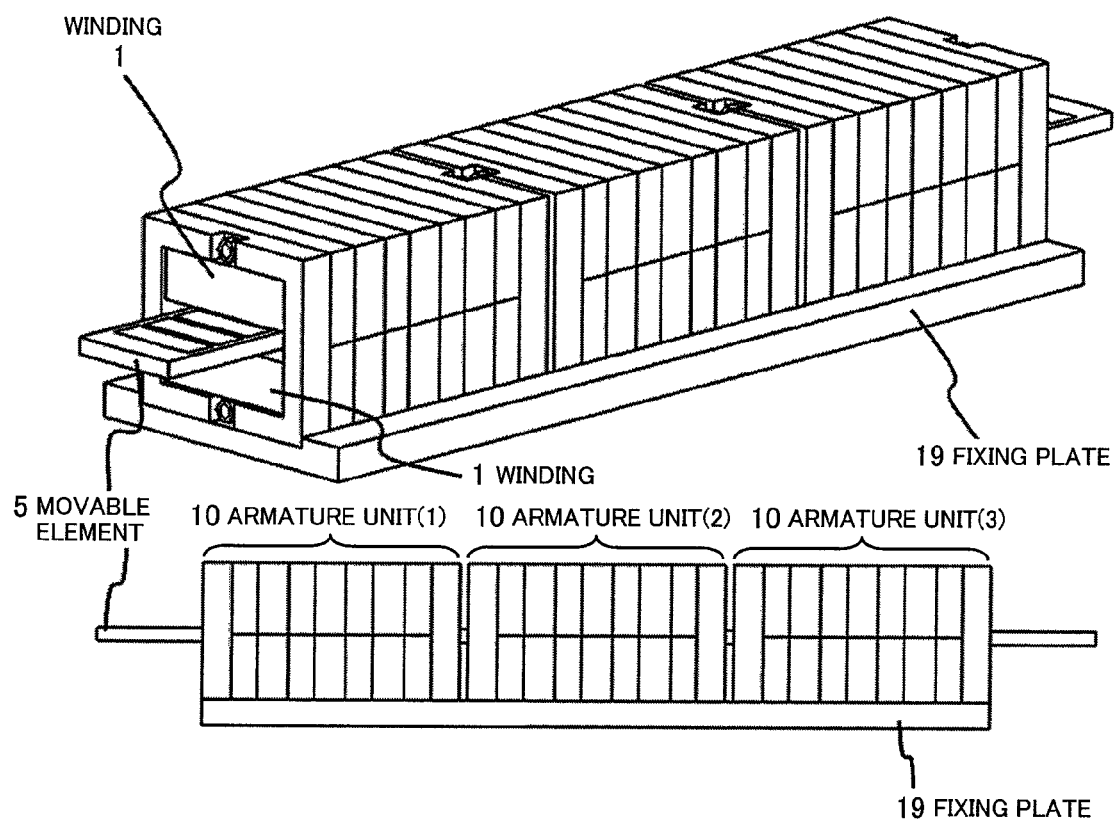
FIG. 31 shows a perspective view and a side view of another modification of the armature unit of the linear motor in accordance with embodiment 18 of the present invention.

FIG. 31 shows a perspective view and a side view of another modification of the armature unit of the linear motor in accordance with embodiment 18 of the present invention. The drawing is an example in which three armature units (10) are assembled individually with shafts and fixed to a fixing plate (19).

Figure 32:
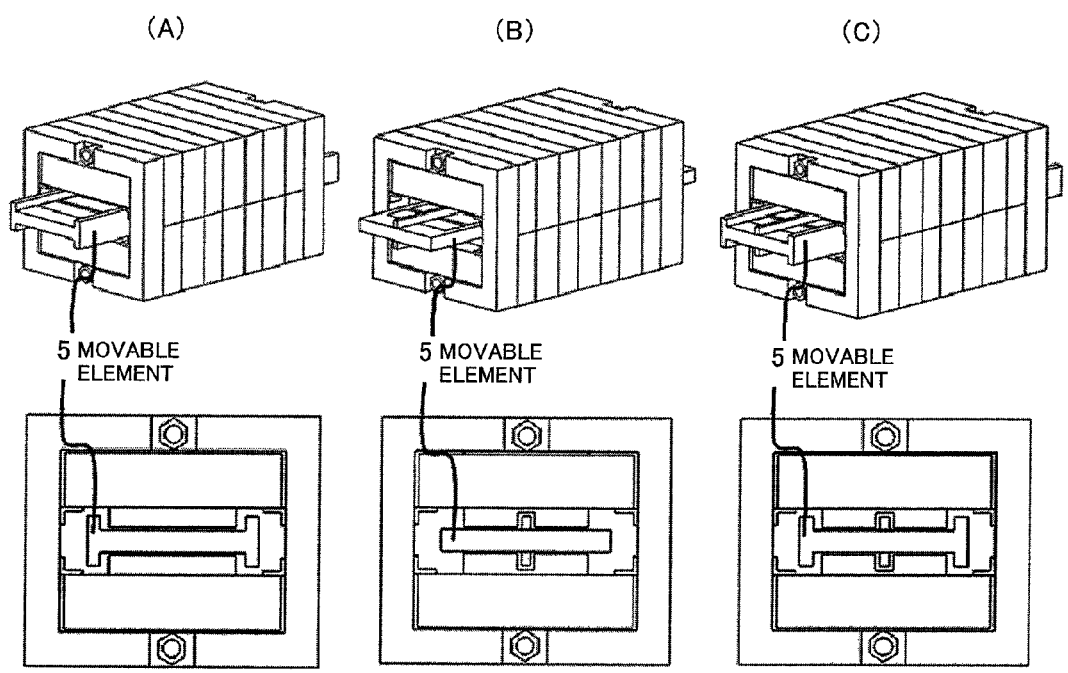
FIG. 32 shows a perspective view and an elevated view of yet another modification of the armature unit of the linear motor in accordance with embodiment 18 of the present invention.

FIG. 32 shows a perspective view and an elevated view of yet another modification of the armature unit of the linear motor in accordance with embodiment 18 of the present invention. FIGS. 32(A), (B), (C) show examples in which cross-section shapes of movers (5) are different from each other. In FIG. 32(A), the example of the H-shaped cross-section mover (5) is shown, and in FIG. 32(B), the example of the cross shape mover (5) is shown. Moreover, in FIG. 32(C), the example of a combination of the mover shapes in FIGS. 32(A) and 32(B) is shown. The movers (5) of each shape can be constituted as one or by assembling components manufactured individually.

Figure 33:
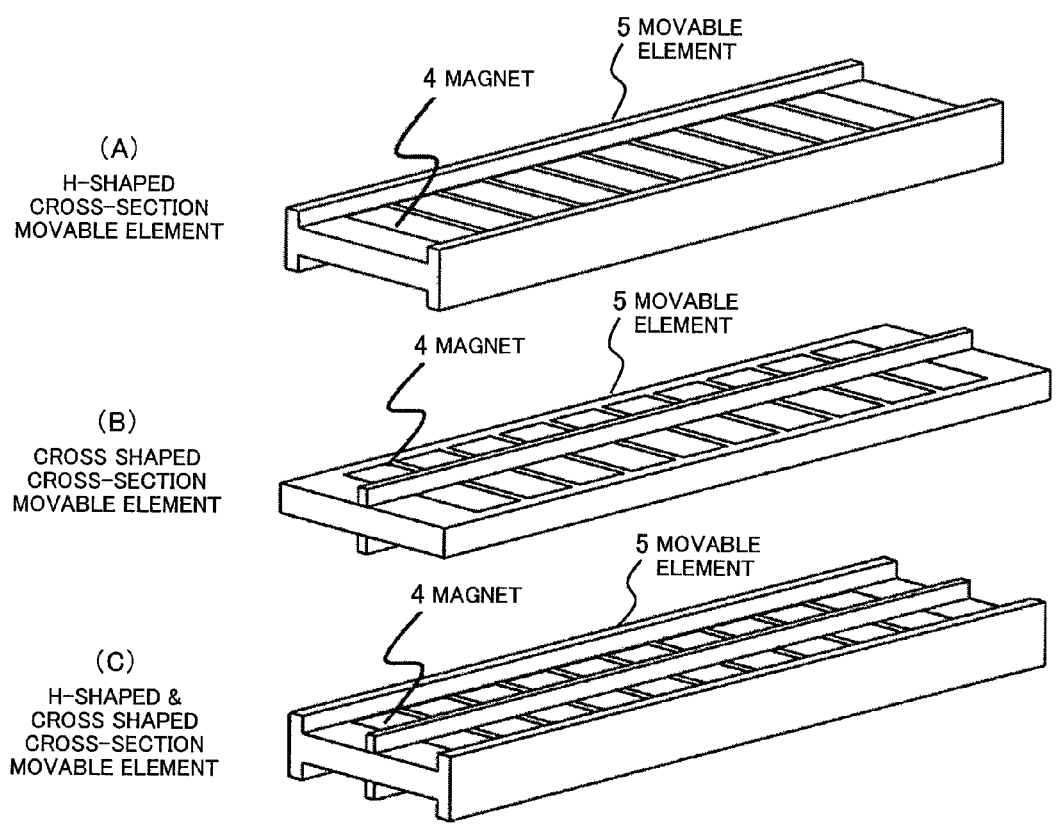
FIG. 33 is an overall perspective view of the movers shown in FIG. 32.

FIG. 33 is an overall perspective view of the mover shown in FIG. 32.

Figure 34:
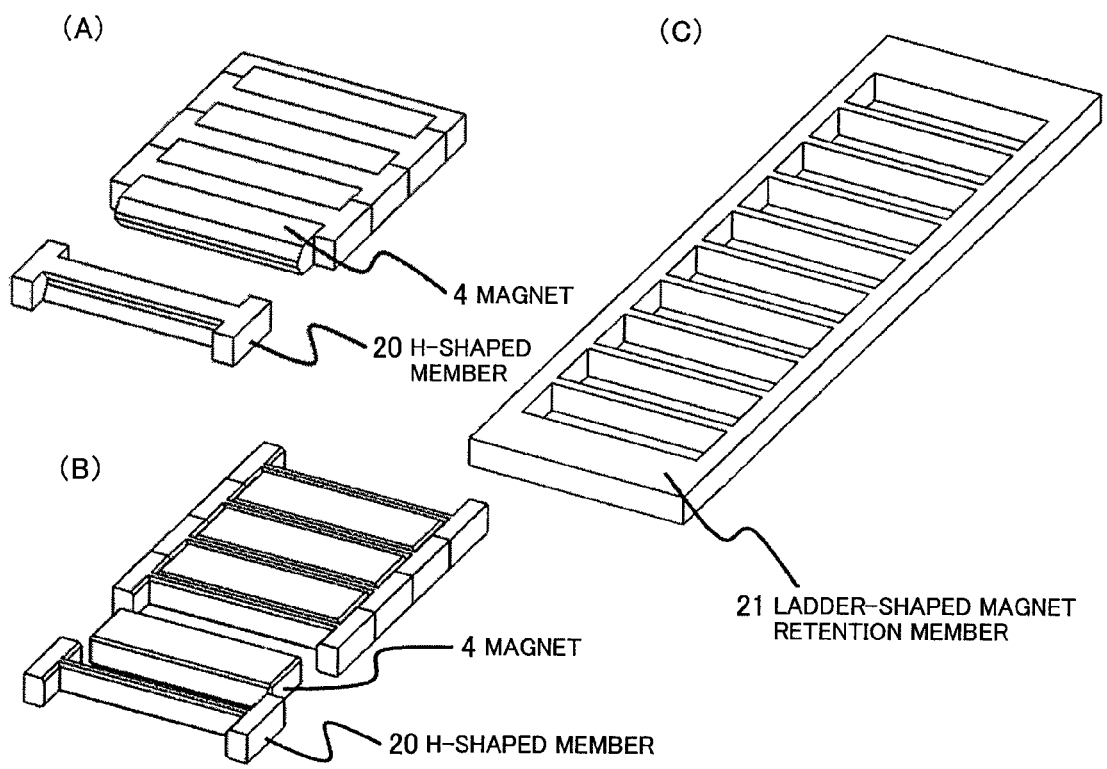
FIG. 34 shows an embodiment of mover constitution of the armature unit of the linear motor in accordance with embodiment 18 of the present invention.

FIG. 34 shows an example of mover constitution of the armature unit of the linear motor in accordance with embodiment 18 of the present invention. In FIG. 34(A), members between the magnets (4) are made individually and pinched out. By pinching H-shaped members (20), the magnets (4) can also be retained. In FIG. 34(B), adhesive holes are made for when each part is chamfered and the magnets (4) are glued. In FIG. 34(C), a ladder-shaped magnet retention member (21) is shown of which the part to retain the magnets (4) of the mover (5) is made to be ladder-shaped.

Embodiment 20

Figure 35:
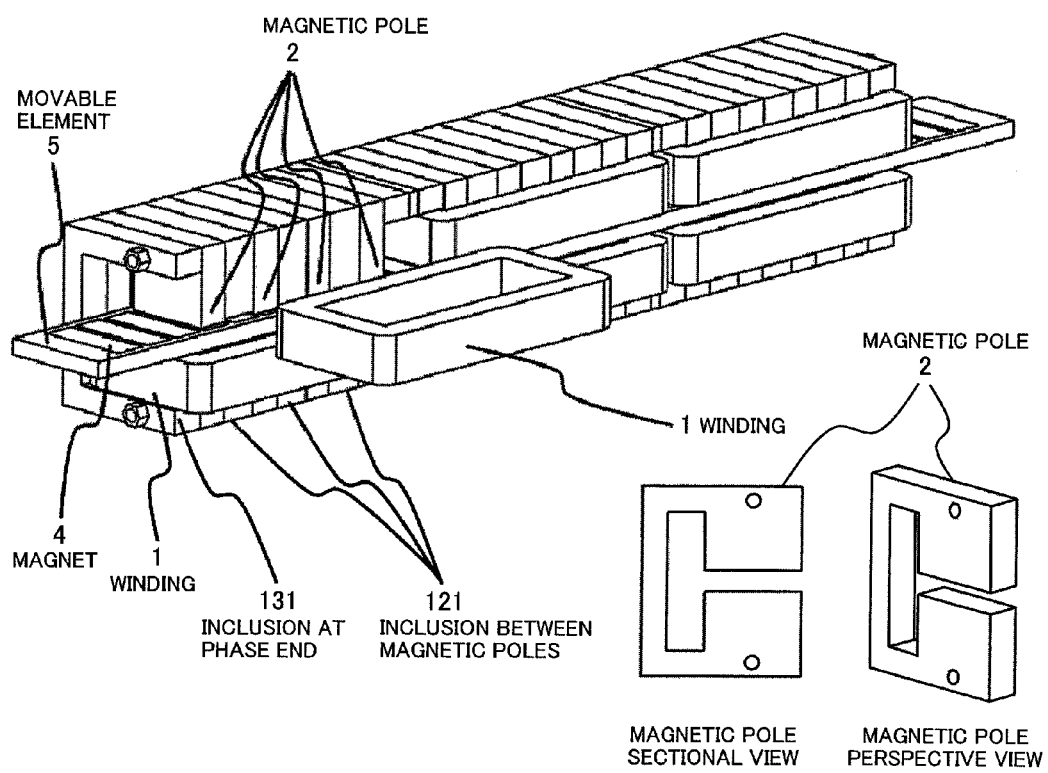
FIG. 35 shows a partly exploded perspective view of an armature unit of a linear motor and a drawing showing magnetic pole structure in accordance with embodiment 19 of the present invention.

FIG. 35 shows a partly exploded perspective view of the armature unit of the linear motor and a drawing showing the magnetic pole structure in accordance with embodiment 19 of the present invention. The drawing shows an example of an open type linear motor of which the shape of magnets (2) etc. is made to be C-shaped. The linear motor is shown without upper winding(s) (1) for easy understanding of core shapes. By adopting a structure like that, support can be made from one side. Alternatively, by fixing the mover (5) to walls etc., the C-shaped armature unit can be moved. In addition, alternatively, by arranging the mover (5) and the armature unit (10) etc. to be arcuate or curved, the mover (5) or the armature unit (10) can be made to rotate.

In this specification, the linear motors are mainly described about three phase structures but are not limited to three phase linear motors. Any phase of linear motors can be constituted with identical armature units (10) depending on the arrangement of the armature units.

According to the embodiments of the present invention, it is possible to change the dimensions easily and to change the magnetic pole positions so as to reduce thrust ripples etc. by the inclusions at phase ends (13) or (131), inclusions between magnetic poles (12) or (121), inclusions between phases (14), magnetic poles (2), etc. In addition, besides the components described above, flat shims etc. can be used for fine-tuning, and other shapes of inclusions and spacers can be used for adjustment. Moreover, a similar effect can be obtained even if the inclusions etc. having magnetic properties are formed with the magnetic poles as one.

The magnetic poles and inclusions of each embodiment can be made by laminating magnetic steel plates, or can be constituted with a powder magnetic core etc. For other members, it is effective to use materials having high permeability. In addition, when each member is constituted by laminating laminar material, similar effects can be obtained even if ramped parts and arcuate parts are stepwise.

Figure 36:
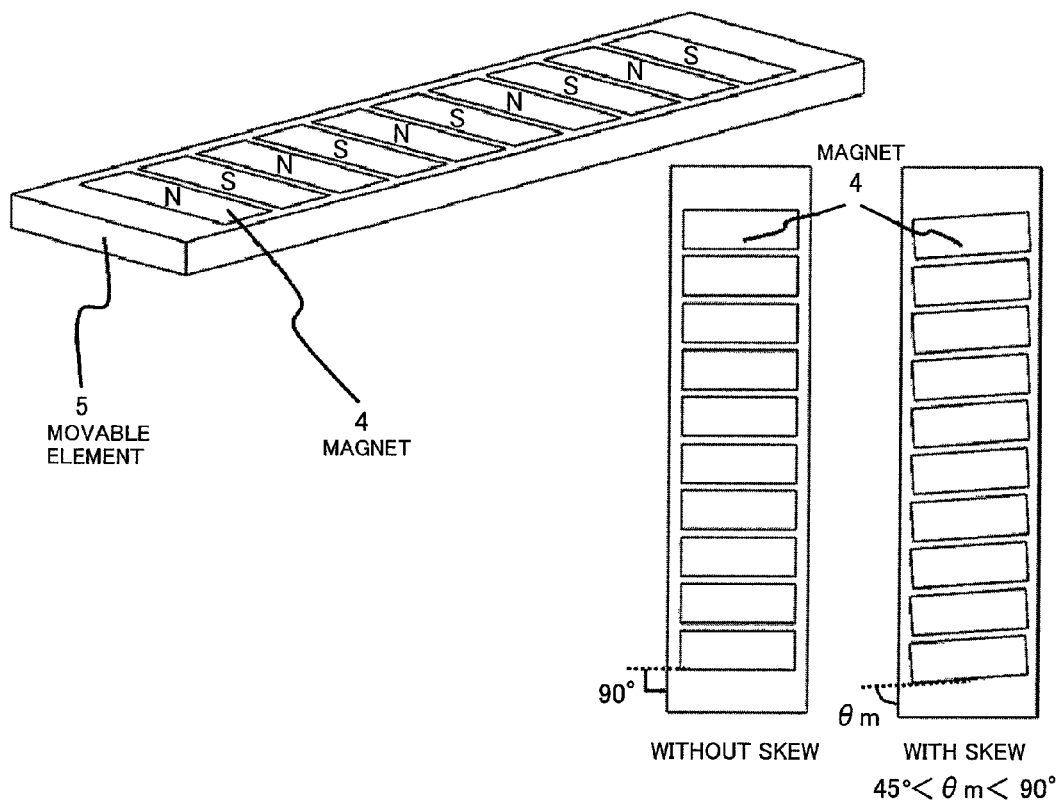
FIG. 36 shows a perspective view and two top views showing magnet arrangement of a mover of a linear motor in accordance with an embodiment of the present invention.

FIG. 36 shows a perspective view showing the magnet arrangement of a mover of a linear motor and two top views showing the presence or absence of skew in accordance with an embodiment of the present invention. By arranging the magnets (4) on the movers (5) so that the angle θm between the longer direction of the mover (5) and the magnets (4) is 45°<θm<90°, the thrust ripple can be controlled easily by synergetic effects with other thrust ripple reduction actions. By applying this magnet (4) arrangement to each embodiment described above, the thrust ripples can be controlled more easily.

The number of magnetic poles of the present invention is not limited to the numbers shown in the embodiments etc.

What is claimed is:
1. A linear motor comprising:
 a mover having a plurality of permanent magnets arranged so that magnetic poles of adjacent magnets are inverted; and an armature unit comprising a plurality of magnetic poles having a pair of magnet pole teeth oppositely arranged at both sides of the permanent magnets of said mover via an air gap an cores connecting between the pair of magnetic pole teeth, and a plurality of magnetic pole set comprising an armature winding(s) that are wound around said cores of the plurality of magnetic poles in common;

wherein the linear motor generates thrust to move the armature unit and the mover relatively; and wherein the linear motor comprises a magnetic pole pair of which magnetic pole pitch (Pc) against the magnet pitch (P) of the permanent magnets is $Pc=2nP\pm2P/qk$, where $n=1, 2, 3, \ldots$, a ripple component which should be reduced is k-th harmonic order, $k=1, 2, 4, \ldots$, and q=number of magnetic poles constituting the magnetic pole pair.

2. The linear motor according to claim 1, wherein the linear motor comprises a magnetic pole pair of which magnetic pole pitch (Pc) against the magnet pitch (P) of the permanent magnets is $Pc=2nP\pm P/(qkM)$, where the phase number $M=1, 2, 3, \ldots$.

3. The linear motor according to claim 1, wherein the plurality of magnetic pole set are arranged to keep an interval in moving direction of the mover.

4. The linear motor according to claim 3, wherein the magnetic pole pair pitch (Pg) is $Pg=2aP\pm P/(qjM)$, where $a=1, 2, 3, \ldots$, the other ripple component which should be reduced is j-th harmonic order, $j=1, 2, 3, \ldots$.

5. The linear motor according to claim 3, wherein the magnetic pole pair pitch (Pg) is $Pg=2aP\pm P/(qjM)$, where the armature winding(s) are M phase, $M=1, 2, 3, \ldots$, the other ripple component which should be reduced is j-th harmonic order, $j=1, 2, 3, \ldots$.

6. The linear motor according to claim 1, wherein inclusions are arranged at the ends of the armature unit or between plural armature units.

7. The linear motor according to claim 6, wherein the inclusions are a magnetic material.

8. The linear motor according to claim 1, wherein magnetic inclusions are arranged at the both ends of the armature unit and nonmagnetic inclusions are arranged between the plural armature units.

9. The linear motor according to claim 1, wherein the armature unit is constituted so that there exists inter-space between the magnetic poles.

10. The linear motor according to claim 1, wherein the armature unit is constituted so that plural armature iron cores having same polarity and/or magnetic poles are divided to put the armature windings therebetween.

11. The linear motor according to claim 1, wherein chamfer dimensions of corner parts of a magnet cross-section shape in the longer direction of the mover (Cm) against the magnet cross-section length (Lm) is 10 Cm>Lm.

12. The liner motor according to claim 1, wherein chamfer dimensions of tip corner parts of the magnetic pole teeth cut in the traveling direction (Ct) against the width of the magnetic pole teeth (Lt) is 10 Ct>Lt.

13. The linear motor according to claim 1, wherein chamfer dimensions of corner parts of a magnet cross-section shape in the longer direction of the mover (Cm) against the magnet cross-section length (Lm) is 10 Cm>Lm and chamfer dimensions of tip corner parts of the magnetic pole teeth cut in the traveling direction (Ct) against the width of the magnetic pole teeth (Lt) is 10 Ct>Lt.

14. The linear motor according to claim 1, wherein the armature unit is constituted by putting magnetic inclusions between the magnetic poles, and parts facing the permanent magnets of the inclusion are formed arcuately.

15. The linear motor according to claim 1, wherein the arrangement direction of the permanent magnets against the traveling direction of the mover ($\theta$m) is $45°<\theta m<90°$.

16. The linear motor according to claim 1, wherein the linear motor is constituted by combining a plurality of the armature units.

17. The linear motor according to claim 1, wherein the arrangement direction of the permanent magnets against the traveling direction of the mover ($\theta$m) is $45°<\theta m<90°$.

18. The linear motor according to claim 1, wherein the linear motor is constituted by combining a plurality of the armature units.

* * * * *